US005169481A

United States Patent [19]

Braunshteyn et al.

[11] Patent Number: 5,169,481

[45] Date of Patent: Dec. 8, 1992

[54] APPARATUS MAKING THIN LAMINATE STRUCTURES AND FORMING THE STRUCTURES INTO LIGHTWEIGHT, THIN-WALLED TUBES

[75] Inventors: Mike Braunshteyn, Richmond; James E. Hall, Mechanicsville; Reginald W. Newsome; Jack C. Wheless, both of Richmond; Kathleen S. Whittle, Chester, all of Va.

[73] Assignee: Philip Morris Incorporated, New York, N.Y.

[21] Appl. No.: 494,761

[22] Filed: Mar. 16, 1990

[51] Int. Cl.[5] .............................................. B32B 31/04

[52] U.S. Cl. ...................................... 156/378; 156/64; 156/189; 156/190; 156/191; 156/192; 156/203; 156/218; 156/252; 156/461; 156/465; 156/466; 156/513; 131/58; 131/60; 131/67; 131/68; 131/69; 131/73; 131/75; 131/84.1; 131/252; 131/253; 131/254; 131/281; 131/286; 131/287; 131/289; 131/369

[58] Field of Search ............... 156/203, 218, 252, 461, 156/465, 466, 189, 190, 191, 192, 510, 513, 64, 378; 264/154, 155, 156; 83/660, 682; 131/58, 59, 60, 68, 69, 67, 66.1, 73, 75, 84.1, 252, 253, 254, 281, 286, 287, 289, 359, 330, 347, 369

[56] References Cited

U.S. PATENT DOCUMENTS

| | | | |
|---|---|---|---|
| 1,876,029 | 9/1932 | Smith | 131/60 |
| 1,996,066 | 4/1935 | Garling | 156/192 |
| 2,003,494 | 6/1935 | Reynolds | 156/252 |
| 2,998,337 | 8/1961 | Tillotson | 156/252 |
| 3,019,573 | 2/1962 | Navikas | 156/252 |
| 4,219,727 | 8/1980 | Bolt | 131/281 |
| 4,478,670 | 10/1984 | Heyse et al. | 156/203 |
| 4,707,207 | 11/1987 | Baus | 156/252 |
| 4,807,648 | 2/1989 | Breckwoldt | 131/369 |
| 4,942,888 | 7/1990 | Montoya et al. | 131/369 |
| 4,978,406 | 12/1990 | Nakano | 156/190 |

FOREIGN PATENT DOCUMENTS

| | | | |
|---|---|---|---|
| 697337 | 9/1953 | United Kingdom | 156/466 |
| 736018 | 8/1955 | United Kingdom | 156/201 |

*Primary Examiner*—Caleb Weston

[57] ABSTRACT

An apparatus for laminating at least two strips of strip material and forming the laminate into lightweight, thin-walled tubular members that may be used in the construction of non-combustion smoking articles.

138 Claims, 11 Drawing Sheets

APPARATUS MAKING THIN LAMINATE STRUCTURES AND FORMING THE STRUCTURES INTO LIGHTWEIGHT, THIN-WALLED TUBES

FIELD OF THE INVENTION

The present invention relates to apparatuses that laminate two or more thin, continuous strips of material into a thin, continuous laminate strip that is then formed into thin-walled tubes. More specifically, the present invention relates to apparatuses that laminate two or more thin, continuous metal foil strips, and a continuous porous paper strip into a thin, continuous laminate strip that is formed into thin-walled tubes.

BACKGROUND OF THE INVENTION

The advent of non-combustion smoking articles has brought about construction considerations that were not faced in the manufacture of conventional smoking articles. Such non-combustion smoking articles have the basic appearance of conventional cigarettes. However, beyond that outward appearance, they are very different.

Non-combustion smoking articles may include a short combustible fuel element and a flavor bed. The fuel element is mounted in one end of a reflective inner sleeve and extends from the sleeve. The flavor bed is contained within the inner sleeve and held in place by structures disposed across the inside diameter of the inner sleeve.

The inner sleeve, which has the fuel element extending from one end and the flavor bed contained within it, is enclosed by an air permeable, laminate outer sleeve which has aluminum foil layer at the inside diameter and a porous paper at the outside diameter. An end cap is fixed at the lighting end of the outer sleeve.

The outer sleeve may be formed from a fully laminated structure consisting of porous paper as the outside layer and a metal foil as the inside layer. The outer sleeve also may consist of a porous paper tube with metal foil disposed at its inner surface. In this latter case, the metal foil is connected to the porous paper only along an adhesive line that is disposed adjacent to one of the edges of the porous paper.

When the outer sleeve is made from either of the laminate, the metal foil at the inside diameter is used to reflect the heat radiated from a burning fuel element back toward the interior of the smoking article. The metal foil at the inside serves not only to reflect the heat, but to thermally isolates the fuel element from the outer porous paper layer. Thus, it acts as a heat shield.

The outer sleeve, with the combination within it that includes the fuel element, flavor bed, and inner sleeve, has a thin-walled tube fitted to its non-lighting end. This tube, which functions as an expansion chamber, serves as the mouth end of the smoking article. The distal end of this tube may be fitted with a filter. The outer sleeve with its contents and the expansion chamber may be overwrapped with cigarette paper.

There have been problems in the perforating the metal foil that serves as the heat shield in either configuration of the outer sleeve. The heat shield, besides thermally isolating the fuel element and reflecting the heat that is radiated by the burning fuel element, must also allow a predetermined amount of air to pass through it to sustain a burning fuel element.

The porous paper/metal foil laminate that is used for outer sleeves must have certain characteristics. Some are that the outer sleeves must have the porosity in CORESTA to allow a predetermined amount of air to pass through them and they must be reasonably sturdy to support the inner sleeve that disposed within it. Further, the outer sleeves have to have the outward appearance of a conventional cigarette and not contribute to the taste of the non-combustion smoking article when smoked.

The problem that arises with regard to perforating the metal foil laminate is that it must be perforated in such a manner that the amount of relieved metal foil is minimized. This is necessary for two reasons. First, the metal foil particles may clog the perforation apparatus. Second, it helps insure that there is an effective heat shield. That is, if the perforation holes are too large, large amounts of heat will be lost rather than reflected back to the interior of the smoking article. This may result in lower aerosol generation.

Besides the problems that were indicated immediately above regarding perforating the laminate structure, there also have been problems in forming the paper/paper, paper/metal foil, and metal foil/metal foil laminates which do not use adhesive in forming the laminates. It is preferable not to use glue or other adhesive in forming the laminates since they add significantly to the thickness of the resultant tube structure which is not helpful in forming the desired lightweight, thin-walled tubes.

A yet further problem has been forming lightweight thin-walled tubes in general from laminates.

In the manufacture of conventional smoking articles, there have been various methods for making filter tow, making and wrapping filter tow, wrapping tobacco, and wrapping tobacco and filter tow together that have involved the use of apparatuses that have an endless garniture belt. Such garniture belts go into, and through, a garniture to form the finished product.

In filter tow forming, the filter material is placed on the endless garniture belt and the belt carrying this material enters the garniture. In the garniture, the filter material is formed into filter tow by the garniture belt being folded over by folders that force the filter material into the desired shape. The filter material after being forced into this shape is passed through a heating section to complete formation of the filter tow.

In making and wrapping filter tow, and wrapping tobacco, a continuous strip of cigarette wrap is transported to the garniture on an endless garniture belt. As it is transported, an adhesive is placed along an edge of the cigarette wrap. The filter material or tobacco is then deposited in any conventional manner on the cigarette wrap. The garniture belt with the cigarette wrap, and tobacco or filter material disposed on it enters the garniture where the edges of the cigarette wrap are folded around the filter material or tobacco. In folding over the edges, a lap seal is formed by the edges of the cigarette wrap. The adhesive is the sealing agent at the lap seal. The seal is then cooled by a cooling bar and a continuous formed rod is output from the apparatus. In the case of wrapped filter tow forming, the formed filter tow is passed through a heating section before being moved adjacent the cooling bar.

Similarly, in wrapping tobacco and filter tow together, a continuous strip of cigarette wrap is transported toward the garniture on an endless garniture belt. First, an adhesive is applied to an edge of the cigarette wrap. Next, the tobacco and filter tow sections are alternatively, and adjacently, deposited on the belt. The combination enters the garniture where the cigarette wrap folds around both the tobacco and filter tow sections. Again, the edges of the cigarette wrap are overlapped to form a lap seal. The lap seal is cooled with a cooling bar and the continuous rod is output from the apparatus.

In constructing lightweight thin-walled tubes that are to be used as outer sleeves or expansion chamber tubes, there can be no beneficial use of tobacco or filter tow material which will act as a means around which the tubes may be formed.

In the past, the have been a variety of tube forming machines for making a number of different types of tubes. Because of the variety of uses of these tubes, there have been specific construction considerations with regard to the respective types of tubes, considerations which are not necessarily those for making lightweight, thin-walled tubes for use in the manufacture of non-combustion smoking articles. Hence, such machines do not solve the problem now faced in making lightweight thin-walled tubes for non-combustion smoking articles.

A final problem that has been encountered in the constructing lightweight thin-walled tubes is the accumulation of dust and particles in the process tube forming that if not removed from the lamination being used to form the tubes may result in the formation of defective tubes. The fact that such defective tubes have been formed, however, would not be discovered until much later in the manufacturing process. There has been no effective way to minimize the accumulation of the dust and particles to prevent this from happening.

The present invention overcomes these problems and provides an apparatus for laminating two or more paper and metal foil strips, paper strips, or metal foil strips, and forming them into a plurality of tubes that may be suitable used in the manufacture of non-combustion smoking articles.

SUMMARY OF THE INVENTION

The apparatus of the present invention in its various embodiments is for forming lightweight, thin-walled tubes from laminate structures.

The apparatus comprises a front end portion and a tube forming portion. The front end portion processes continuous strips of porous paper and metal foil to form the laminate that the tube forming portion forms into the lightweight thin-walled tubes.

The front end portion forms the laminate in several different ways. When the first embodiment of the front end portion of the apparatus of the present invention is used, the laminate is formed just before entering the tube forming portion. In the first embodiment, a continuous strip of metal foil is directed over a number of guide rollers to the nip of a pair of perforation rollers. The perforation rollers perforate the metal foil within a predetermined range of porosity in CORESTA. After the metal foil is perforated, one side of the foil is smooth while the other side is jagged or rough.

After leaving the nip of the rollers, the jagged side of the metal foil moves over a scraper. The scraper removes the jagged foil extending from the rough side of the foil. In scraping the foil, the size of the perforations increases and the porosity in CORESTA increases. The metal foil strip now passes through the nip of a pair of calendar rollers which flattens the metal foil strip so it is again smooth on both sides.

Once the metal foil is calendared, it passes through a suction guide for porosity measurement, cleaning, guiding. The continuous metal foil strip is then directed to the tube forming portion.

The continuous porous paper strip passes over a number of guide rollers enroute the tube forming portion. On its way, it passes an adhesive applicator that applies adhesive adjacent both of the edges of the porous paper strip.

The porous paper strip joins the perforated, scraped, and calendered metal foil strip just before they enter the tube forming portion. One of the adhesive lines laminates the metal foil strip and the porous paper strip. The other adhesive line is used in tube making. After the two are laminated, the resultant laminate enters the tube forming portion to be shaped into tube.

When the second embodiment of the front end is used, the laminate is formed by feeding a continuous strip of metal foil past a series of guide rollers to the nip of a pair of rollers that perforate the metal foil strip. The metal foil is perforated in the same manner as described for the first embodiment of the front end portion to preserve as much metal foil as possible around each perforation site. The perforated metal foil strip, therefore, has one side that is smooth, and another side that is rough because of the jagged metal foil around each perforation.

After the metal foil strip has been is perforated, a porous paper strip is disposed adjacent the rough side of the metal foil strip. The perforated metal foil and porous paper strips are fed through the nip of a pair of rollers which calendar then together to form a laminate.

This embodiment of the front end portion further includes guide rollers to keep the metal foil and porous paper strips in the proper alignment when passing though the perforation and calendaring rollers so there is a desired offset between the two strips that comprise the laminate that being formed. As in the first embodiment of the front end portion, the apparatus includes means to tension the metal foil strip, porous paper strip, and laminate within predetermined ranges.

Upon leaving the nip of the calendar rollers, the laminate passes the tube forming portion of the apparatus of the present invention.

The third embodiment of the front end portion of the apparatus of the present invention has two continuous strips of metal foil, and a continuous strip of porous paper fed to it. Each of the continuous strips of metal foil pass over separate sets of guide rollers and enter the nip of respective pairs of shaping and perforation rollers. These rollers shaped and perforated the metal foil strips in a predetermined manner. The two shaped and perforated metal foil strips are then fed to the nip of a pair of rollers that mechanically bond them to form a laminate structure.

The laminate structure that issues from the laminating rollers next passes through a suction guide for porosity measurement, cleaning, and guiding (for subsequent stations). The laminate structure then moves past a lubrication station that applies a lubricant to one side of the metal foil laminate structure. After the lubricant is applied, the laminate structure is laminated with the continuous porous paper. This latter formed laminate enters that tube forming portion of the apparatus of the invention.

The continuous strip of porous paper passes over a number of guide rollers enroute to the tube forming portion of the apparatus of the invention. As it does, it passes an adhesive applicator which applies adhesive adjacent both edges of the porous paper strip. When the porous paper strip and the metal foil laminate structure are laminated, one of adhesive lines fixes the laminate structure to the porous paper strip to form a laminate the tube forming portion uses to make a tube. The other adhesive line will be used in the actual tube forming.

The fourth embodiment of the front end portion of the apparatus of the present invention processes two metal foil strips in the same manner as the third embodiment of the front end portion. The difference, however, is that it also processes a porous paper strip with one of the metal foil strips. That is, the porous paper strip is fed to the nip of one of the pairs of shaping and perforation rollers along with a metal foil strip. The porous paper strip is processed in the same manner as this metal foil strip and is laminated to the metal foil strip by the shaping and perforation rollers.

The laminate structure which comprises a porous paper layer and a metal foil layer is laminated to the other shaped and perforated metal foil strip. The laminate, as it moves toward the tube forming portion, processed by a porosity measuring, cleaning and guiding device. Upon leaving this device, the laminate moves past an adhesive applicator that applies adhesive adjacent to one edge of the laminate. Next, the laminate passes a lubrication station.

The adhesive line is used in tube forming. The lubrication is applied to the metal foil side of the laminate for use in tube forming.

The tube forming portion of the apparatus of the present invention, like the front end portion, has a number of embodiments. Specifically, there are three embodiments of the tube forming portion of the apparatus of the present invention.

All of the embodiments of the front end portion provide a laminate to tube forming portion that has an exposed adhesive line along one of the edges.

In the first embodiment of the tube forming portion of the apparatus of the present invention, just prior to the lamination entering the garniture, the laminate is disposed on an endless garniture belt. The endless garniture belt is the means by which the laminate is advanced through the tube forming portion and the apparatus of the present invention in general.

The garniture includes a garniture block and the side folders desposed which are mounted on the garniture block. The folders fold over the laminate as it enters the garniture.

The garniture block with folders has an elongated mandrel disposed in it. The mandrel is pivotally mounted so that it has some freedom of movement in the garniture. This freedom of movement prevents possible pinch points between the mandrel and garniture block. Pinch points, if they exist, may result in laminate tearing while being processed.

The mandrel is solid and has two sections. The first section thāt is disposed at the beginning of the garniture has a cross-sectional shape that is substantially circular with a flat lap. This section along with the side folders form the lap seal that seals the tube being formed. The second section of the mandrel has a substantially circular cross-sectional shape. This section is used for processing the lap seal along with a heating bar.

After the tube and lap seal are formed, the lap seal is moved adjacent an elongated heating bar which dries the lap seal adhesive. The heating bar extends substantially the remainder of the length of the garniture between the side folders disposed on the garniture block.

Following tube forming, the tube is cut to desired lengths and sent to at least one other apparatus for further processing before being used in the manufacture of non-combustion smoking articles.

In a second embodiment of the tube forming portion of the apparatus of the present invention, the mandrel is heated and the heating bar is replaced with a pressure belt. The pressure belt is concave an moves along with the formed tube. This reduces drag on the tube. Besides these changes, the second embodiment of the tube portion is the same as the first embodiment of the tube forming portion.

In the third embodiment of the tube forming portion of the apparatus of the present invention, the mandrel is heated, however, full side folders extend the length of the garniture block, and a full wrap garniture belt is used. Other than these differences, it is the same as the first embodiment of the tube forming portion of the apparatus of the present invention.

An object of the present invention is to provide an apparatus for forming lightweight, thin-walled tubes from strip material that has a front end portion for perforating and laminating the strip material and a tube forming portion for forming the perforated and laminated strip material output from the front end portion into lightweight thin-walled tubes.

Another object of the present invention is to provide an apparatus that has a front end portion that is capable of forming a laminate from at least one continuous metal foil strip and one continuous porous paper strip without the use of glue or other similar type of adhesive.

A still further object of the present invention is to provide an apparatus that has a front end portion that is capable of laminating at least one continuous metal foil strip with a continuous porous paper strip without compromising the porosity of the continuous porous paper strip.

A yet further object of the present invention is to provide an apparatus that has a front end portion that is capable of forming a laminate from two or more continuous metal foil strips without the use of glue or other similar type of adhesive.

Another object of the present invention is to provide an apparatus that has a front end portion that is capable of laminating two or more continuous metal foil strips and a continuous porous paper strip without the use of glue or other similar type of adhesive.

A still further object of the present invention is to provide an apparatus that has a front end portion that measures the porosity of a perforated continuous metal foil strip or laminate that includes at least one continuous metal foil layer in the lightweight, thin-walled tube forming process.

A further object of the present invention is to provide apparatus that has a tube forming portion that uses a heating bar in forming lightweight, thin-walled tubes.

Another object of the present invention is to provide an apparatus that has a tube forming portion that uses a pressure belt in forming lightweight, thin-walled tubes.

A further object of the present invention is to provide an application that has a tube forming portion that uses in full length folders and a full wrap garniture belt in forming lightweight, thin-walled tubes.

A still further objective of the present invention is to provide tube forming portions that has a heated mandrel that is used in forming lightweight, thin-walled tubes.

These and other objects of the present invention will be described in detail in the remainder of the specification and shown in the accompanying drawings.

DETAILED DESCRIPTION OF THE DRAWINGS

The present invention is an apparatus for forming lightweight, thin-walled tubes that may be used in the manufacture of non-combustion smoking articles. The apparatus includes a front end portion and a tube forming portion. The front end portion has four separate embodiments and the tube forming section has three.

Figure 1A:
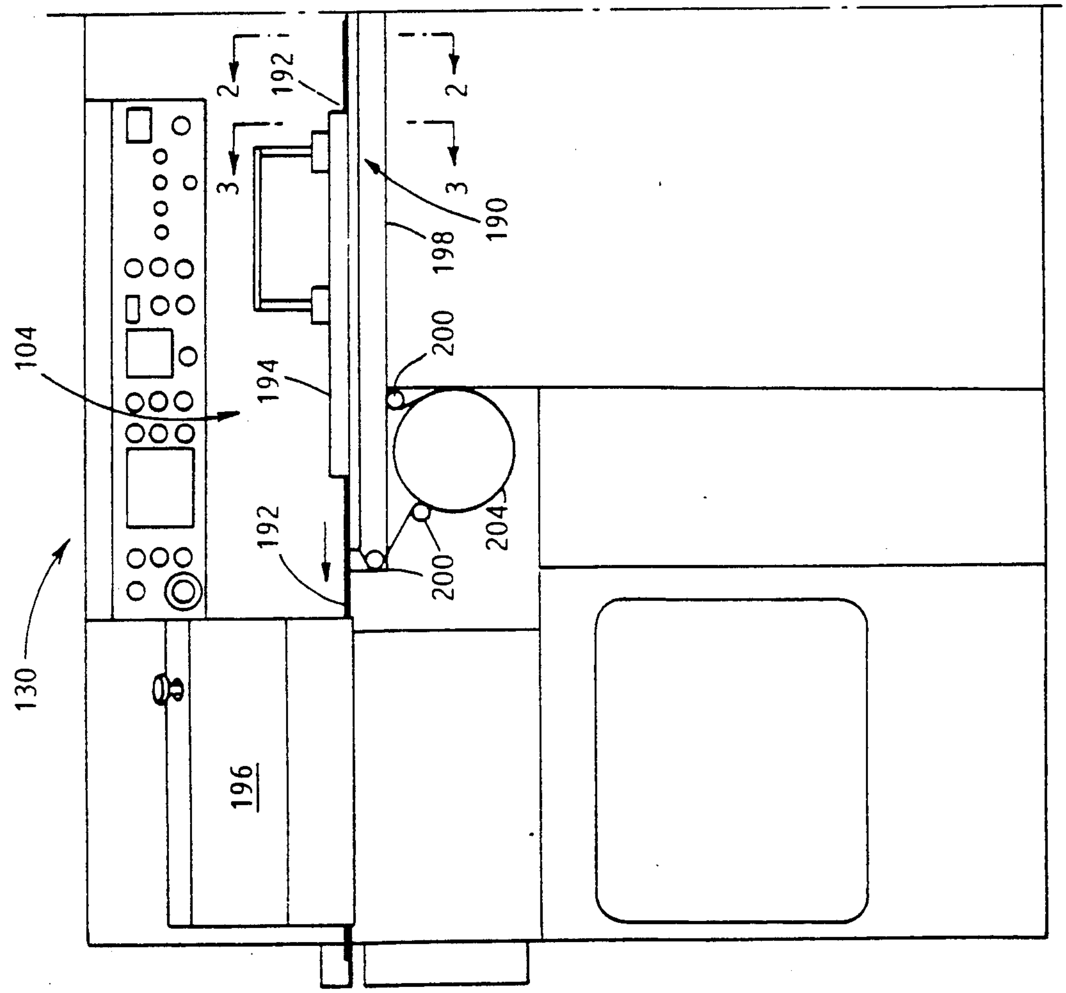
FIG. 1 is a front perspective view of the first embodiment of the apparatus of the present invention for forming lightweight, thin-walled tubes.
Figure 1B:
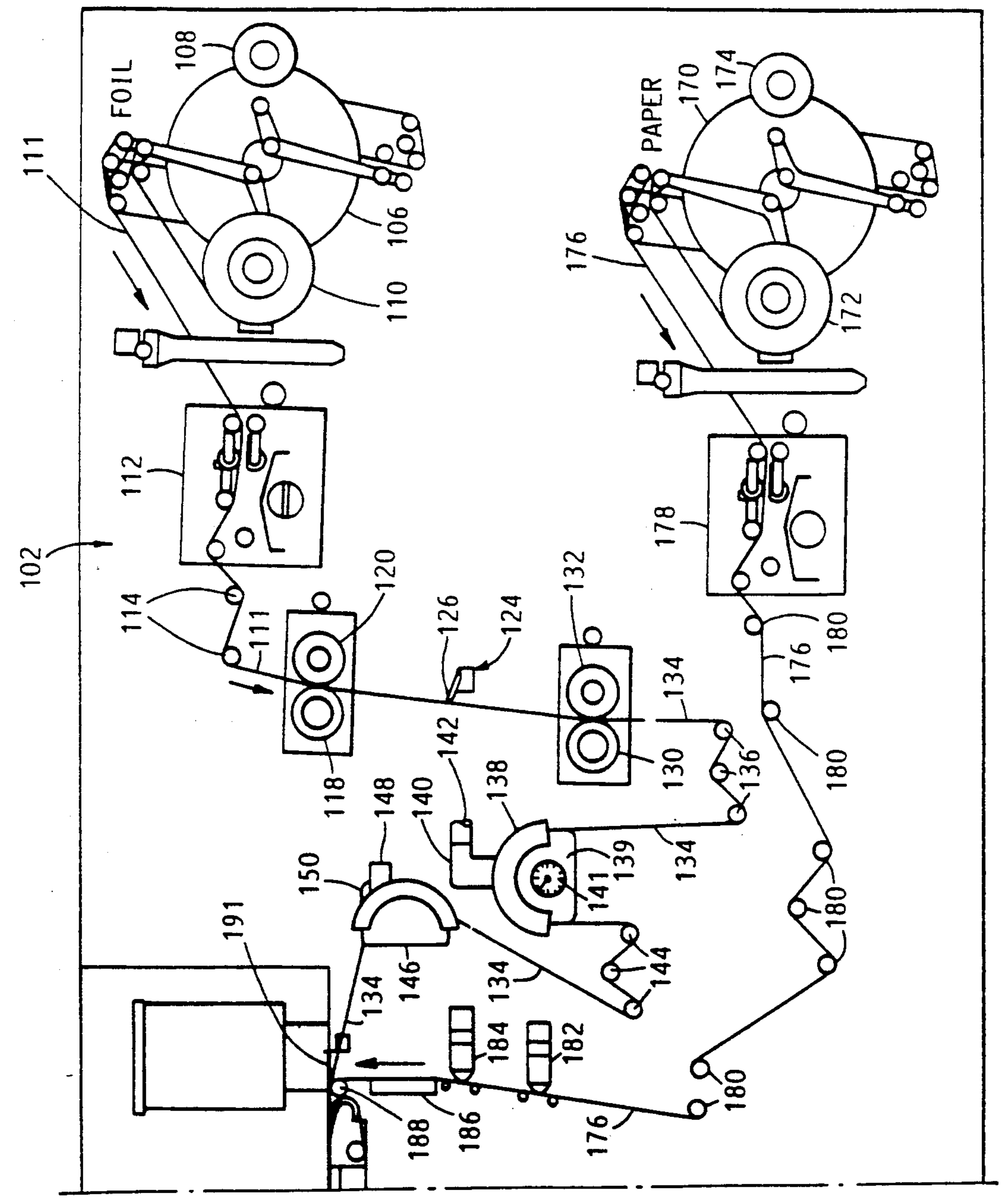
Figure 2:
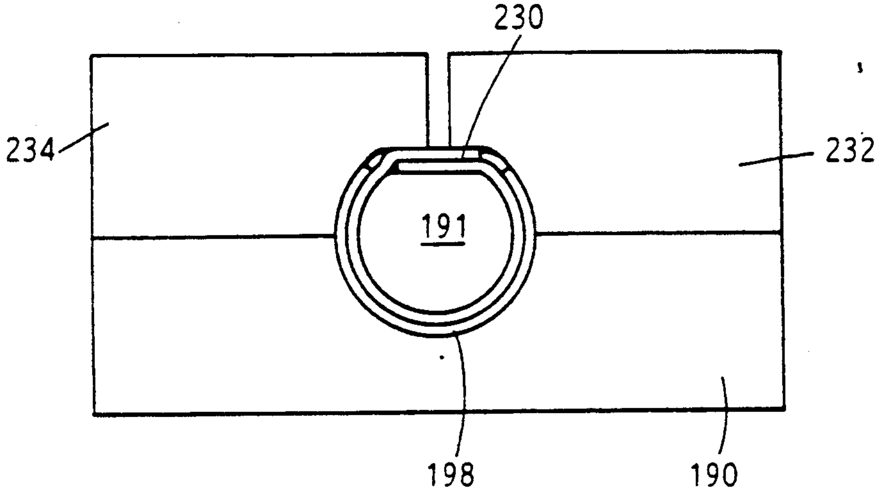
FIG. 2 is a cross-sectional view of the apparatus of the present invention at 2—2 of FIG. 1.
Figure 3:
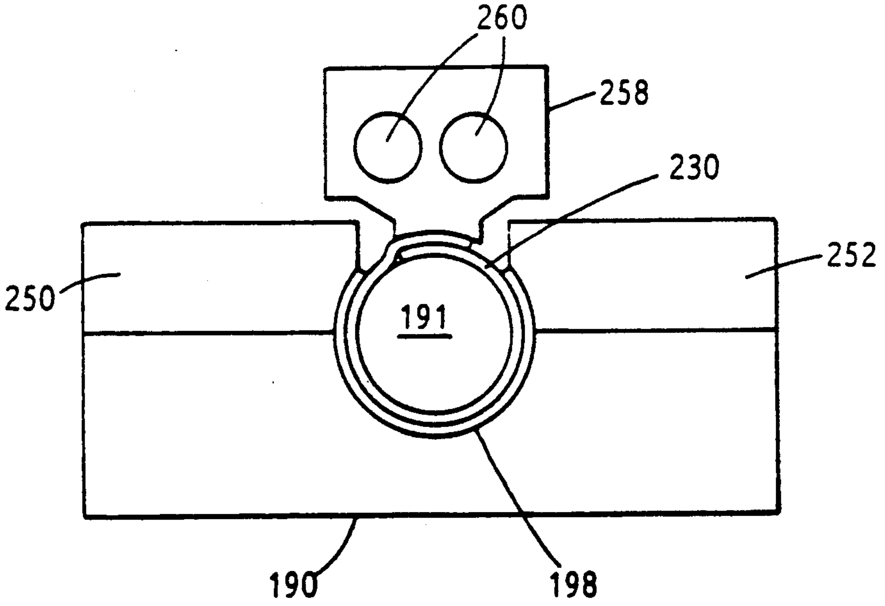
FIG. 3 is a cross-sectional view of the apparatus of the present invention at 3—3 of FIG. 1.
Figure 4:
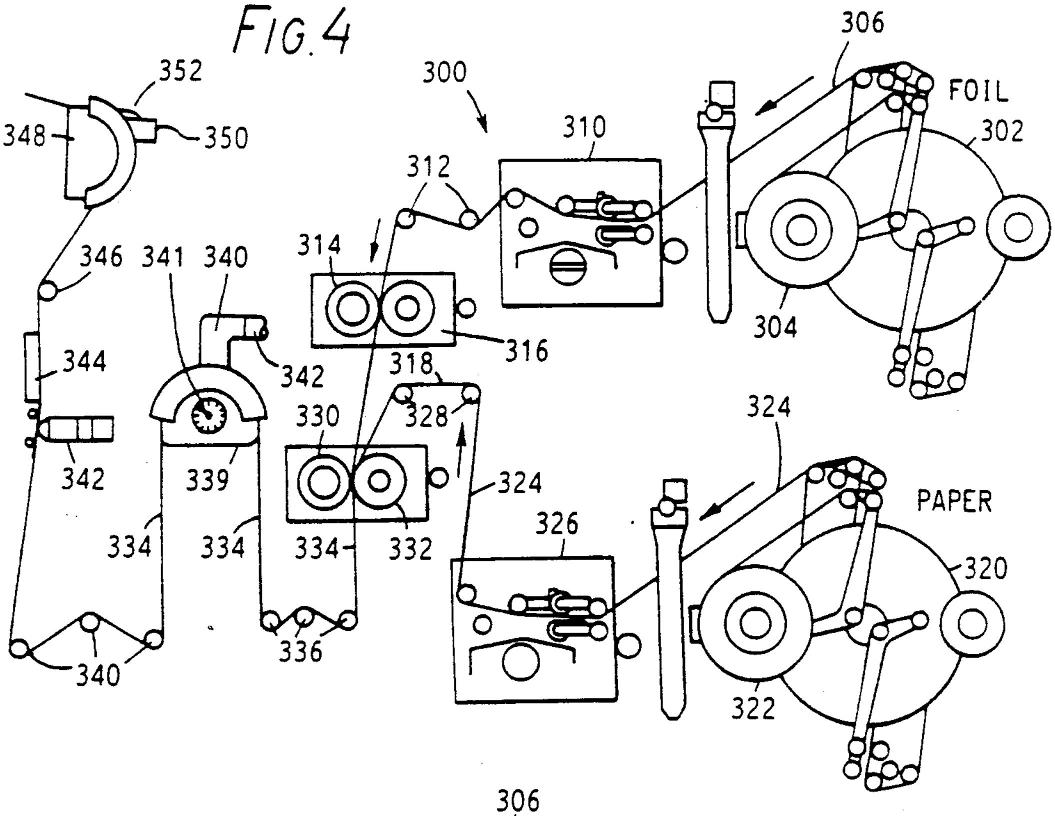
FIG. 4 shows a second embodiment of the front end portion of the apparatus of the present invention.
Figure 5:
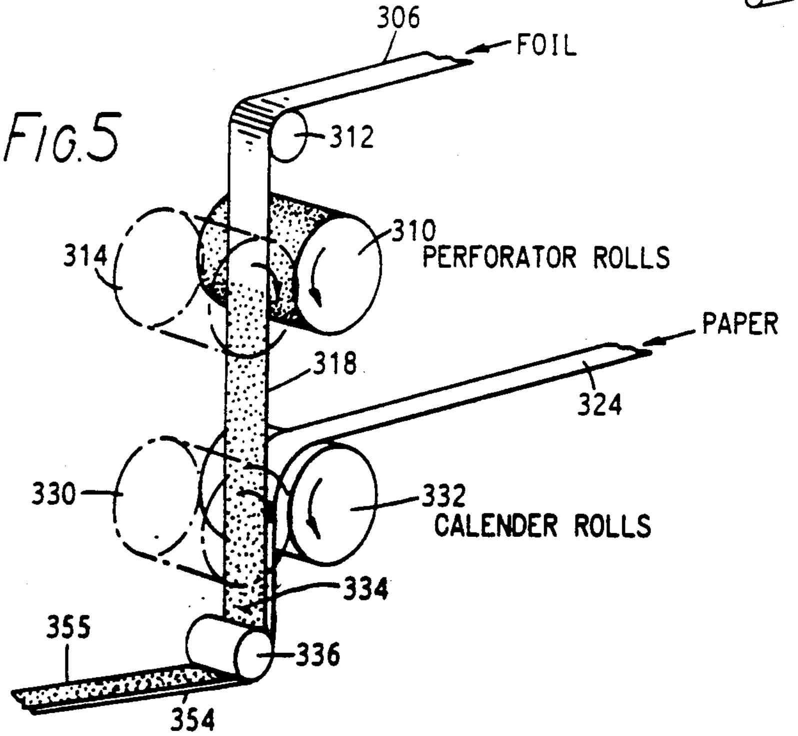
FIG. 5 shows an enlarged view of a section of the front end portion of the apparatus of the invention shown in FIG. 4.
Figure 13:
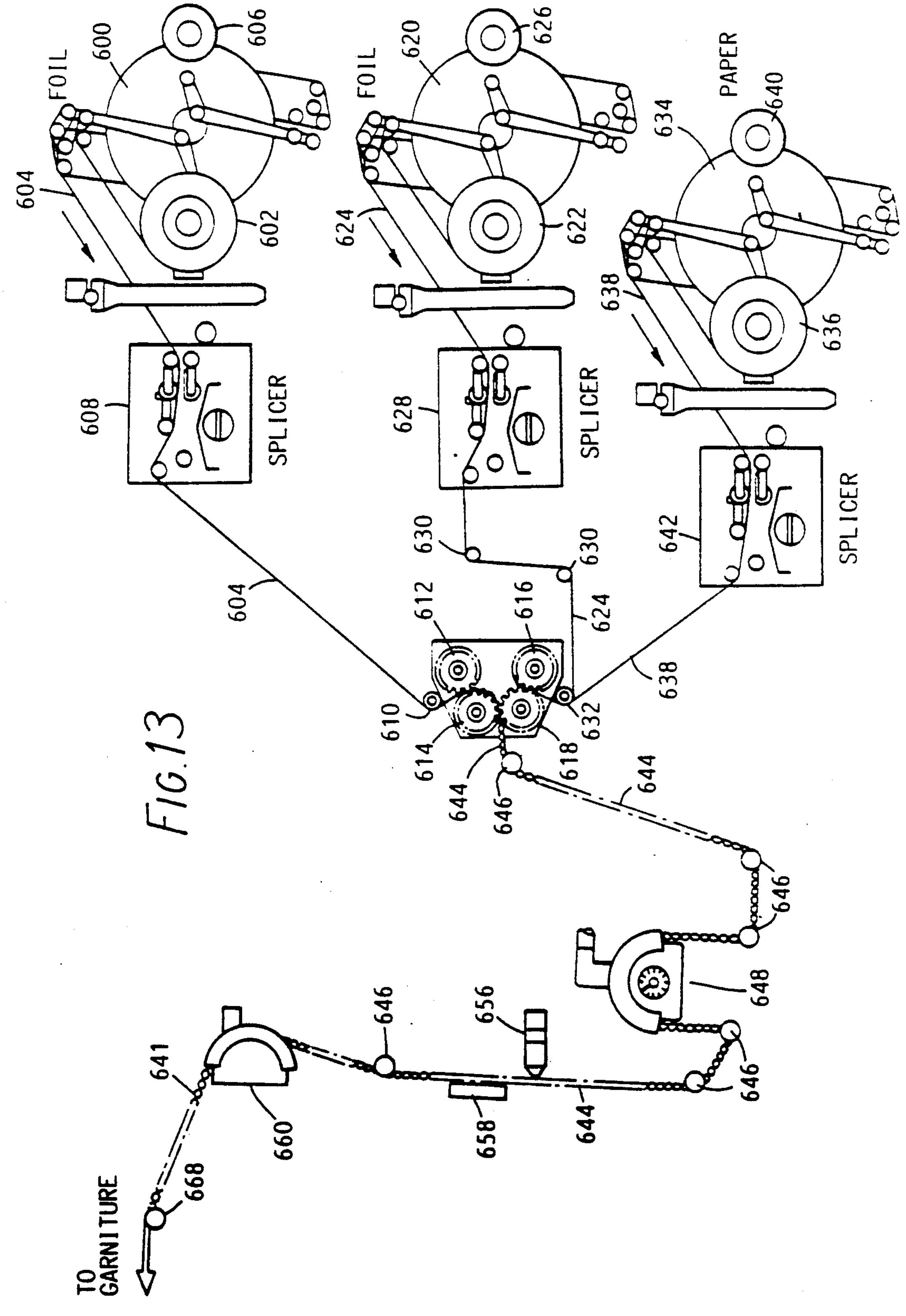
FIG. 13 shows a fourth embodiment of the front end portion of the apparatus of the present invention.
Figure 14:
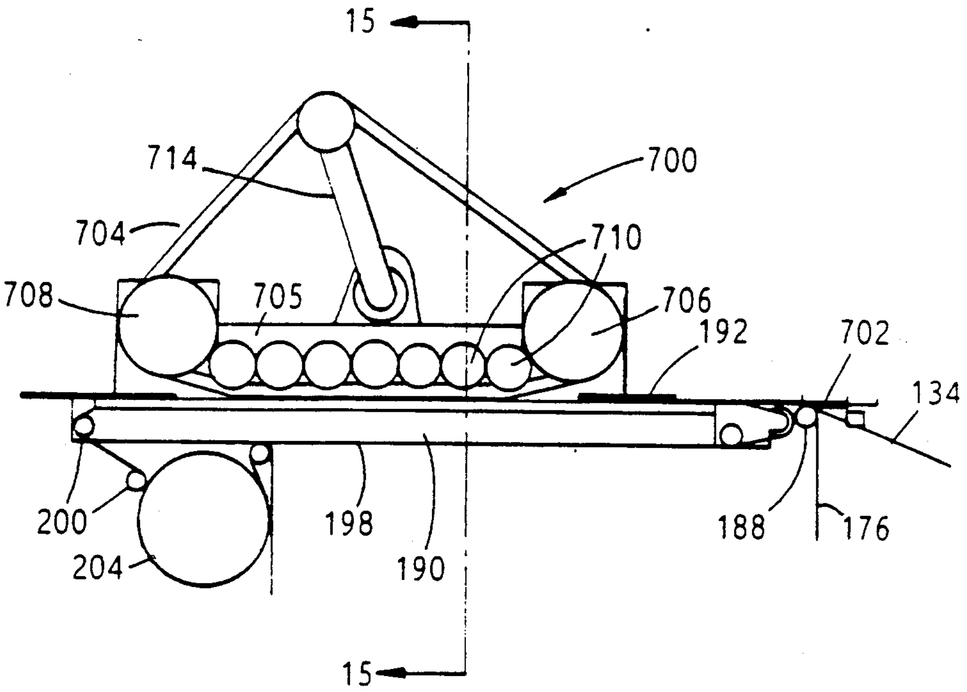
FIG. 14 shows a front perspective view of a second embodiment of the tube forming portion of the apparatus of the present invention.
Figure 15:
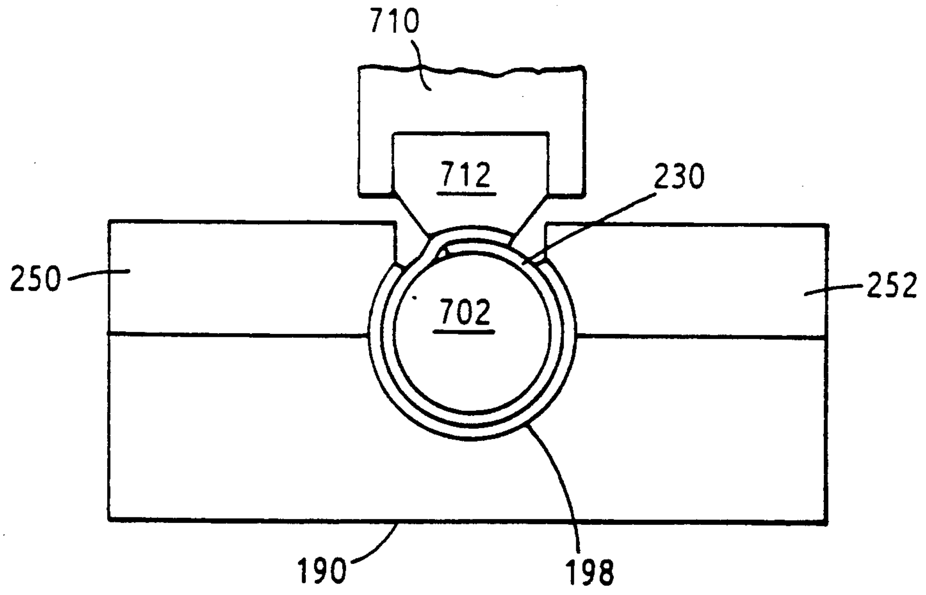
FIG. 15 is a cross-sectional view of the apparatus of the present invention at 15—15 of FIG. 14.
Figure 16:
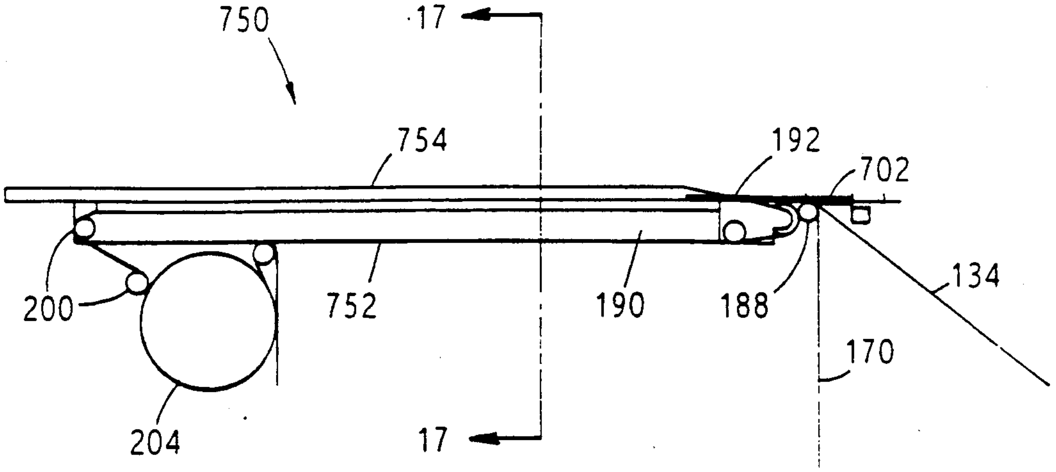
FIG. 16 shows a front perspective view of a third embodiment of the tube forming portion of the apparatus of the present invention.
Figure 17:
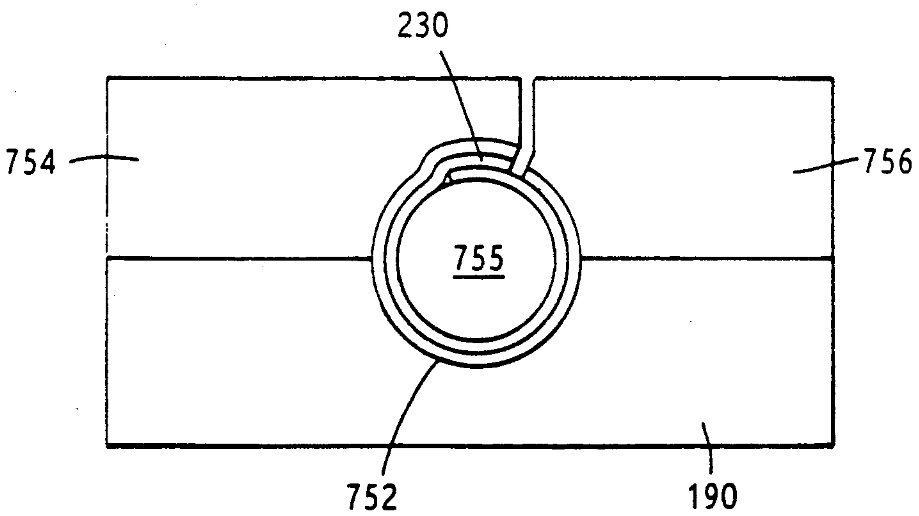
FIG. 17 is a cross-sectional view of the apparatus of the present invention at 17—17 of FIG. 16.

The apparatus of the present invention that is shown in FIGS. 1-3 is the first embodiment of both the front end portion and the tube forming portion. FIGS. 4 and 5 show views of the second embodiment of the front end portion. FIGS. 6-12 relate to the third embodiment of the front end portion. FIG. 13 shows the fourth embodiment of the front end portion. FIGS. 14 and 15 show views of the second embodiment of the tube forming portion of the apparatus of the present invention. And FIGS. 16 and 17 show views of the third embodiment of the tube forming portions of the apparatus of the present invention.

Referring to FIGS. 1-3, the apparatus of the present invention is shown generally at 100. Bobbin support 106 and splicer 112 form the metal foil strip feed for the apparatus of the present invention.

The bobbin support 106 normally has two bobbins of aluminum foil strip mounted on it, with one, such as bobbin 110, supplying the metal foil strip to the perforation rollers of the apparatus, while the other bobbin which would be disposed on bobbin spindle 108 is in stand-by. When the bobbin supplying the metal foil strip becomes low, the second bobbin is spliced-in to supply the metal foil strip. Once the first bobbin is empty, it is replaced with a new bobbin. This procedure is repeated so that the metal foil strip is continuously fed to the perforation rollers of the apparatus. Preferably, strip 111 is an aluminum foil strip that is 0.0015 inches thick.

Bobbin support 106 and splicer 112 are configured to tension the metal foil strip within a predetermined range.

After metal foil strip 111 leaves splicer 112, it passes over a plurality of guide rollers 114 which align metal foil strip 111 for entering the nip of perforation rollers 118 and 120.

Male perforation roller 118 and female perforation roller 120 have mating surfaces. The male perforation roller has an array of raised pins on its surface. The pins on the male roller are aligned with relief areas in the surface of female perforation roller 120. The relief areas receive the pins of the male roller at nip where perforation of metal foil strip 111 takes place.

As the metal foil strip passes through the nip of the perforation rollers, the strip is perforated in such a manner that the metal foil at each perforation site is not removed therefrom, as would be the case with a cleanly punched hole, but exploded out at the opposite side of the metal foil strip. More stress failure and break through the metal foil strip. The result is that one side of the metal foil strip has an area of jagged metal foil around each perforation site. Once the metal foil strip has passed through the nip of the perforation rollers, it has a predetermined pattern of perforations in it.

In a further embodiment, the female perforation roller is replaced with a continuous belt with a smooth surface. This belt will depress where the pins of the male perforation rollers contact it. This will result in the same type of perforations that were achieved using the female perforation roller.

The rough side of the metal foil strip is preferably the dull side of the metal foil strip. The dull side is also the side which is disposed adjacent porous paper strip 176 at the tube forming portion of the apparatus of the present invention. Hence, the shiny side of the metal foil strip will constitute one surface of the laminate. This is necessary so that the most reflective surface of the metal foil will be at the inside diameter of the finished tubes.

The perforation rollers perforate the metal foil strip to a porosity of 8–10 CORESTA (Centre de Cooperation Pour les Recherches Scientifiques Relatives au Tabac). The units of CORESTA are milliliters of air/-minute/$cm^2$ of paper at a pressure of 1 kilopascal.

Perforated metal foil strip 122 that leaves the perforation rollers moves past scraper 124 with blade 126. The blade is disposed at an angle of approximately 15° from perpendicular. The scraper removes a large portion of the jagged metal extending from the rough side of the metal foil strip. The scraping also enlarges the perforations.

In a further embodiment of the present invention, the male and female perforation rollers, and the scraper are replaced with an array of pulsed lasers. The lasers will provide substantially the same size of perforations in the metal foil strip that are present after the metal foil strip is scraped.

Perforated and scraped metal foil strip 128 enters the nip of calender rollers 130 and 132. Metal foil strip 128 is calendered by rollers 130 and 132. The surfaces of the calender rollers are smooth to prevent gripping the metal foil strip during the calendering operation. Upon leaving the calender rollers, calendered metal foil strip 134 has a porosity of 20–30 CORESTA.

After leaving the calender rollers, metal foil strip 134 travels over rollers 136 and enters suction guide 138. The suction guide performs three functions: measures the porosity of the metal foil strip, cleans it, and guides it for entering subsequent stations of the apparatus of the present invention.

Porosity measurements are made to ensure that the porosity of the metal foil strip is in the 20–30 CORESTA range. This is needed to provide the finished tubes with the proper amount of air flow to sustain a burning fuel element in a non-combustion smoking a article.

Suction guide 138 has main body 139 and suction fitting 140. Hose 142 connects the suction fitting to a suction source. Gauge 141 indicates the measured porosity of the metal foil strip.

One of the problems that has arisen in the processing of the metal foil strip in the manner described is that some metal particles remain with the metal foil strip when it enters the tube forming portion. If enough of these particles remain with the strip, it may effect formation of the lap seal and, therefore, the finished tubes. Suction guide 138 in making its porosity measurements removes substantially all of the loose metal particles from metal foil strip 134.

After leaving suction guide, metal foil strip 134 passes over rollers 144 and enters lubrication station 146. The station has lubricant reservoir 148 and wick 150 extending from the reservoir. The wick applies a lubricant to predetermined portions of the metal foil strip. That is, the lubricant is applied in such a manner that it will not interfere with the lap seal that will be formed in tube forming portion of the apparatus of the present invention.

Following lubrication, metal foil strip 134 passes over roller 188 where it is laminated to porous paper strip 176. The lamination then enters the tube forming portion.

Porous paper strip 176 is supplied by the porous paper feed system of the front end portion that includes bobbin support 170 and splicer 178. This feed system is similar to the feed system that provides the metal foil strip. Accordingly, bobbin support 170 normally has two bobbins of porous paper strip mounted on it, with one, such as bobbin 172, supplying the porous paper strip, while the second which would be disposed in bobbin spindle 174 is in stand-by.

When the first bobbin of porous paper strip becomes low, the second bobbin is spliced-in to supply porous paper strip to the apparatus. When the first is empty, it is replaced with a new bobbin. This procedure is repeated so that the porous paper strip is continuously fed to the apparatus. As it was with bobbin support 106 and splicer 112, bobbin support 170 and splicer 178 are configured to tension the porous paper strip within a predetermined range.

When the porous paper strip 176 leaves splicer 178 it travels over series of rollers 180 to first adhesive applicator 182. This applicator applies a 2–3 mm adhesive line adjacent a first edge of the porous paper strip, which is preferably the right edge. This adhesive line is used to secure the metal foil strip to the porous paper strip to form the laminate.

As the porous paper strip continues, it passes second adhesive applicator 184. At this applicator, a 1–2 mm adhesive line is applied adjacent to a second edge of the porous paper strip which is preferably the left edge. This adhesive is used in forming the lap seal of the tubes being formed.

After the second application of the adhesive, porous paper strip 176 passes pre-heater 186. The pre-heater pre-dries the adhesive applied adjacent the edges of the porous paper strip. Once past the pre-heater, porous paper strip 176 passes over roller 188 where it is laminated with metal foil strip 134.

The metal foil strip has a smaller width than the porous paper strip. When the two are laminated, the right edges of the strips are aligned so that the 2–3 mm adhesive line adjacent the right edge of the porous paper strip secures the metal foil strip. When they are aligned in this manner, the adhesive line along the left edge of the porous paper strip is not covered by the metal foil strip and is exposed for use in forming the lap seal of the tube. When metal foil strip 176 and porous paper strip 134 are laminated by the adhesive, they form laminate 230 which enters the tube forming portion.

As laminate 230 with the pre-dried adhesive disposed at the left edge prepares to enter the garniture of the tube forming portion, it is disposed on endless garniture belt 198. The garniture belt not only transports the laminate through the garniture, but is the means by which the laminate and its constituent strips of material are transported through the apparatus of the present invention.

The garniture comprises garniture block 190 and side folders 232 and 234. The side folders may have different shapes throughout their lengths to accommodate the different embodiments of the tube forming portion. When the garniture is assembled, a bore is formed for shaping the tube.

Mandrel 191 extends into the garniture. The mandrel is pivotally mounted in the garniture. This provides the mandrel with some degree of movement in the garniture to prevent the incidences of pinch points between the mandrel, the garniture block and side folders.

Mandrel 191 is elongated and may extend substantially the entire length of the garniture. The mandrel is solid. The first section has a cross-section that is substantially circular with a flat top. The second section, which is the remainder of the mandrel, has a substantially circular cross-section. The cross-section of the first and second sections are shown in FIGS. 2 and 3, respectively.

Referring to FIG. 2, the first section is located at the entrance of the garniture. At the entrance, side folders 232 and 234 form a flat surface above the flat top of the mandrel. This configuration of the mandrel and folders helps assure that a strong lap seal is formed.

When the laminate enters the garniture, the lubricant on the foil minimizes drag on the laminate as it passes over the mandrel.

The side folders at the entrance to the garniture curl the belt and, thereby, curl the edges of the laminate over. When the edges of laminate 230 are curled (or folded) over, a flat lap seal is formed because of the shape of the top of the mandrel and the shape of side folders over the top of the mandrel. In forming the lap seal, the exposed, pre-dried adhesive line contacts the outside porous paper strip adjacent the other edge of the laminate, and the free edge of the metal foil strip overlaps the secured edge of the metal foil. Thus, there is at least a metal foil layer and a porous paper layer at all tube thicknesses of the tube being formed, including the lap seal.

After the lap seal is formed in the top flat surface of mandrel 191, the tube passes over the second the mandrel section which has a circular cross-section, as shown in FIG. 3. When the mandrel changes to the circular cross-section, the lap seal pops out to the circular cross-sectional shape.

Referring to FIG. 3, after the cross-sectional shape of tube formed from lamination 230 has changed to circular, the lap seal contacts elongated, concave heater bar 258. The heating bar is disposed between side folders 250 and 252. The heating bar preferably has two elongated heater elements 260 that extend substantially the entire longitudinal length of the bar. The moisture that remained in the adhesive after pre-drying is dried by heating bar 258. Hence, the heating bar has sufficient length and the proper temperature to ensure this amount of drying takes place.

The formed tube exits the garniture after passing the heater bar and enters cutter section 196 of the apparatus of the present invention. The cutter section cuts the continuous tube to desired lengths and sends the cut tubes, for example, to a feed hopper for another apparatus that will perform other work on the tubes before they are used in the manufacture of the non-combustion smoking articles.

FIGS. 4 and 5 show the second embodiment of the front end of the apparatus of the present invention. Bobbin support 302 and splicer 310 form the metal foil strip feed and bobbin support 320 and splicer 326 form the porous paper feed for the second embodiment of the front end portion of the apparatus of the present invention. Bobbin 304 contains metal foil strip 306 and bobbin 322 contains porous paper strip 324. These feed systems operate in the same manner as the feed systems that have been described previously and those descriptions are incorporated here by references.

After metal foil strip 306 leaves splicer 310, it passes over a plurality of guide rollers 312 which align metal foil strip 306 for entering the nip of perforation rollers 314 and 316.

Male perforation roller 314 and female perforation roller 316 have mating surfaces. The male perforation roller has an array of raised pins on its surface. The relief areas of female roller 316 receive the pins of the male roller and the jagged foil around each pin at each perforation site.

As the metal foil passes out of the nip, one side is smooth and the other side has jagged metal foil extending from the surface around each perforation site.

As in the first embodiment of the front end portion, the female perforation roller may be replaced with a continuous belt with a smooth surface. And, as stated, the belt will depress where it is contacted by the pins of the male perforation roller so the same type of perforations are made as with the female roller.

The rough side of the metal foil strip is preferably the dull side of the metal foil strip. This rough side is also the side which bonds to porous paper strip 306. Hence, the shiny side of the metal foil strip will constitute one surface of the laminate.

Porous paper strip 324 is supplied by the porous paper feed of the front end portion which includes bobbin support 326 and splicer 326. Once porous paper strip 324 leaves splicer 326, it passes over a plurality of guide rollers 328 and enters the nip of calender rollers 330 and 332. These guide rollers align the porous paper strip for entering the calender rollers so that is and the perforated metal foil strip are offset. It is to be understood that the porous paper strip and the perforated metal foil strip may be aligned so that they will be laminated with a different offset or with no offset at all and still be within the scope of the present invention.

Porous paper strip 324 and perforated metal foil strip 318 are calendered by rollers 330 and 332. In entering the nip of calender rollers 330 and 332, porous paper strip 324 is adjacent the rough side of metal foil strip 318. The surfaces of the calender rollers are smooth to prevent gripping the perforated metal foil or porous paper strip during the calender operation.

In the nip, some of the jagged metal foil around perforation sites become lodged in, and clamp, fibers of the porous paper strip. This laminates the metal foil strip and the porous paper strip to form laminate 334. The laminating operation does not punctured the porous paper strip so its original porosity is not compromised.

The perforation and calendering operations will be described in detail referring to FIG. 5.

After passing over guide roller 312, metal foil strip 306 is supplied to the nip of perforation rollers 314 and 316. One of the rollers has a male surface and the other a mating female surface. Once the strip of metal foil has passed through the nip of the perforation rollers, perforated metal foil strip 318 has a predetermined pattern of perforations.

The male and female surfaces perforate the foil such that there is a minimal amount of metal foil removed from the metal foil strip. As a result, one side of the foil is smooth while the other side is rough due to the jagged metal foil that extends from the metal foil strip around each perforation site.

Perforated metal foil strip 318 is now laminated with porous paper strip 324. In laminating the two, the rough side of the metal foil strip engages the porous paper strip. The adjacently disposed perforated metal foil and porous paper strips are passed through nip of calender rollers 330 and 332. Calendering the perforated metal foil strip and the porous paper strip form laminate 334.

Preferably, laminate 334 has the shining side of metal foil strip as one surface. This is desirable so that if the laminate is used, for example, for an outer sleeve of a non-combustion smoking article, the most reflective surface of the metal foil strip will be disposed at the inside diameter of the formed sleeve.

As shown in FIG. 5, when the laminate is formed, the foil strip is offset from the porous paper strip to provide porous paper "dry line" 354 along one edge. The offset also provides foil strip 355 along the other edge. The "dry line" may be used for disposition of the adhesive that will be used in forming the lap seals for the finished tubes. The foil strip may be used to overlap the foil adjacent the "dry line" so that there will be metal foil and porous paper at every thickness of the finished tubes.

Upon leaving the calender rollers, laminate 334 passes over a plurality of rollers 336 enroute suction guide 338. Suction guide 338, like suction guide 138 of the first embodiment performs three functions: measures the porosity of the metal foil strip, cleans the metal foil strip, and guides the foil for subsequent stations of the apparatus of the present invention. The porosity measurements are made to ensure that the porosity of the porous paper/metal foil laminate is in a predetermined porosity range in CORESTA.

Suction guide 338 has main body 339 and suction fitting 340. Hose 342 connects to the suction fitting for providing suction air. Gauge 341 indicates the measured porosity of laminate 334.

The suction that is applied to the laminate removes metal particles and paper dust created during the perforation and calender steps that have remained with the laminate. These may effect the proper formation of the lap seal if the particles and dust are not removed.

After leaving suction guide 338, laminate 334 passes over rollers 340 and then moves past adhesive applicator 342 which applies an adhesive along "dry line" 354.

After application of the adhesive, laminate 324 passes pre-heater 344. The pre-heater pre-dries the adhesive applied along the "dry line" before the laminate enters the garniture.

Laminate 324 with the pre-dried adhesive disposed at the "dry line" now passes over roller 346 and enters lubrication station 348. Lubrication station 348, like lubrication station 146 in the first embodiment, has lubricant reservoir 350 and wick 352 extending from the reservoir. The wick applies the lubricant to predetermined portions of the metal foil strip.

Following lubrication, laminate 324 enter the tube forming portion of the apparatus on the present invention which may be the first embodiment of the tube forming portion shown in FIG. 1.

Figure 6:
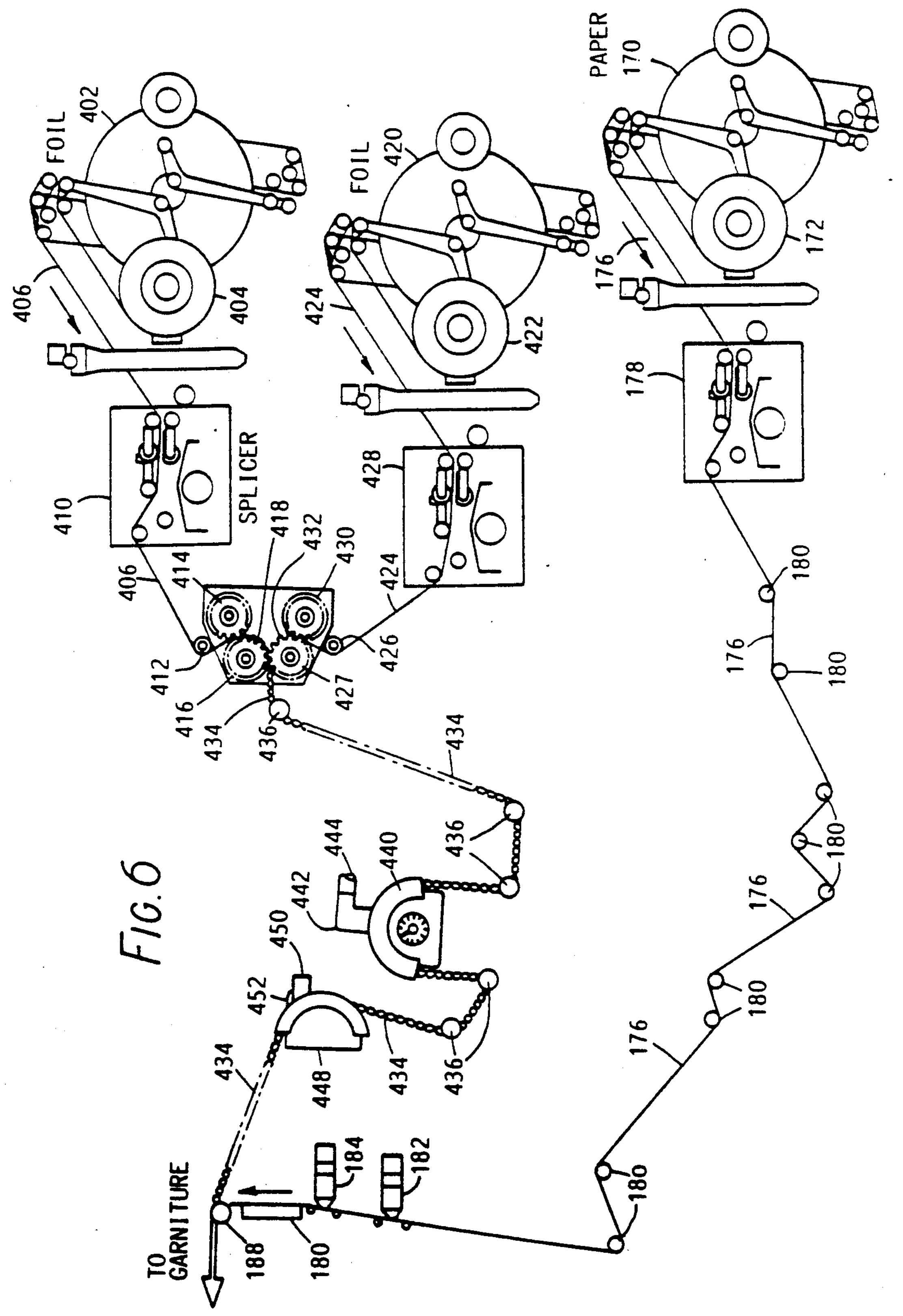
FIG. 6 shows a third embodiment of the front end portion of the apparatus of the present invention.
Figure 7:
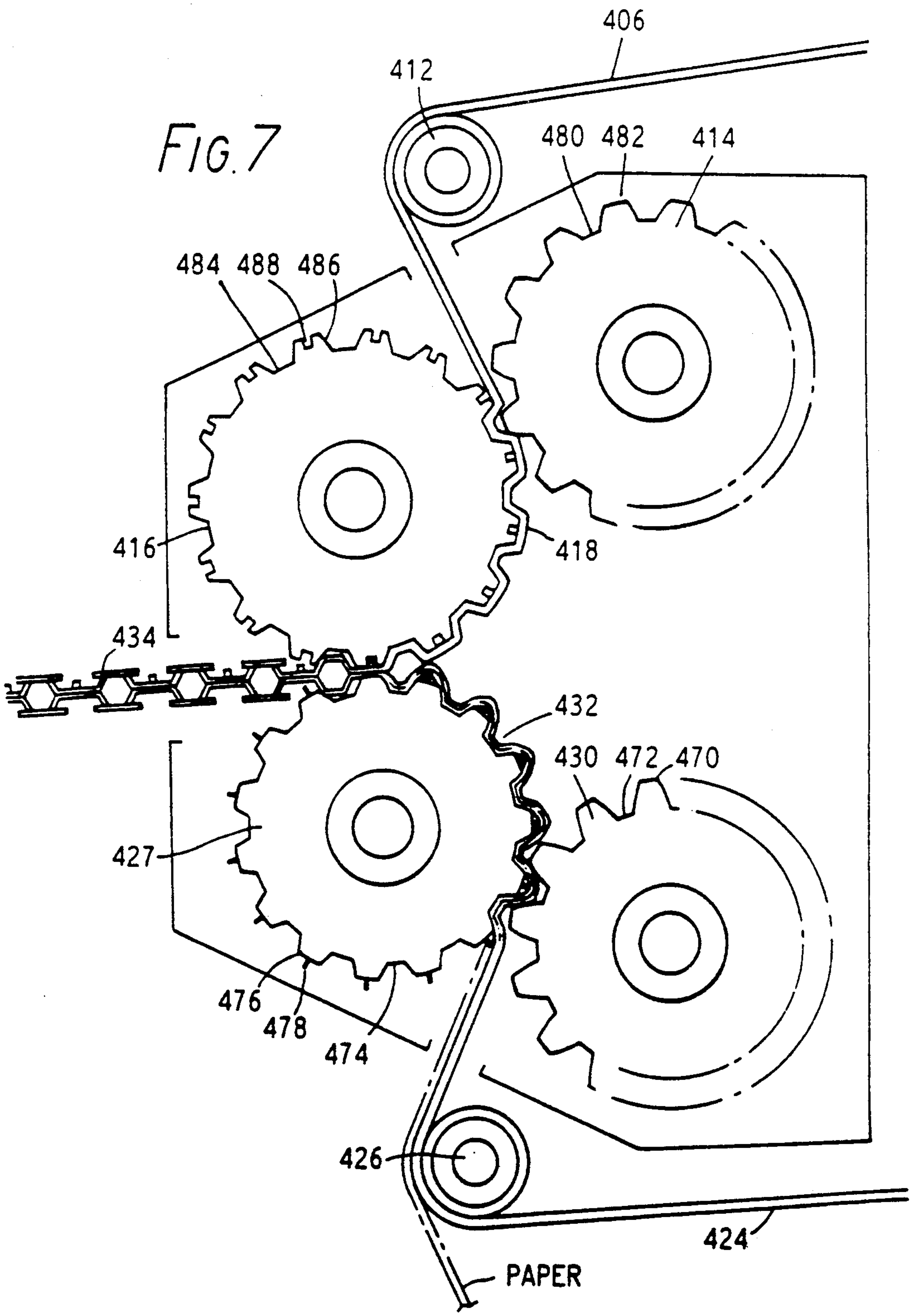
FIG. 7 an enlarged view of a section of the front end portion of the apparatus of the invention shown in FIG. 6.
Figure 8:
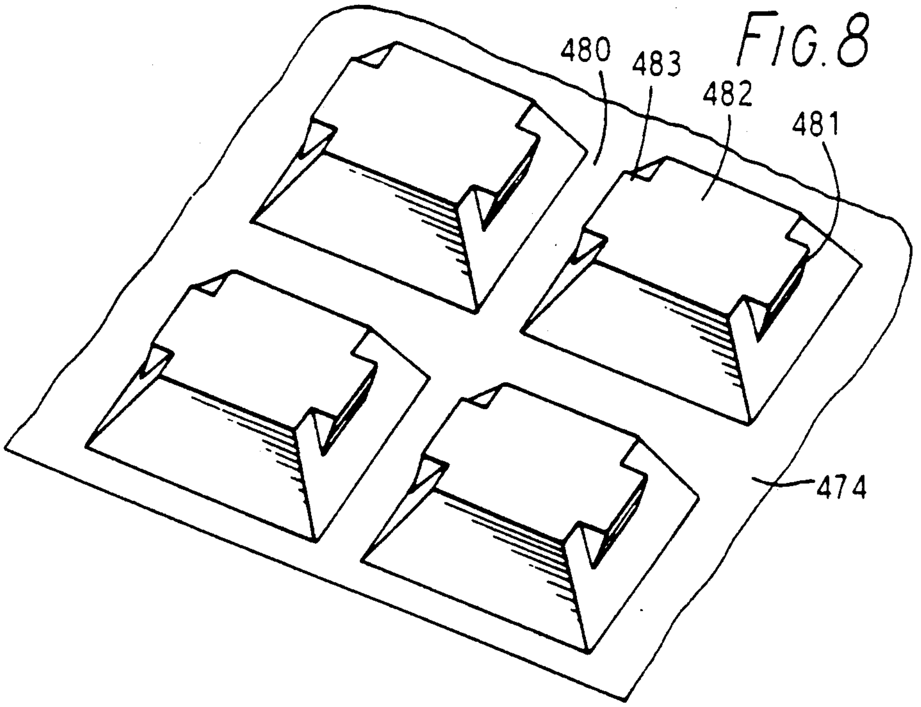
FIG. 8 shows a representative top perspective view of part of the surface of the first and second male shaping and perforation rollers that are used for forming an open cell, air permeable laminate that is used in forming lightweight, thin-walled tubes.
Figure 9:
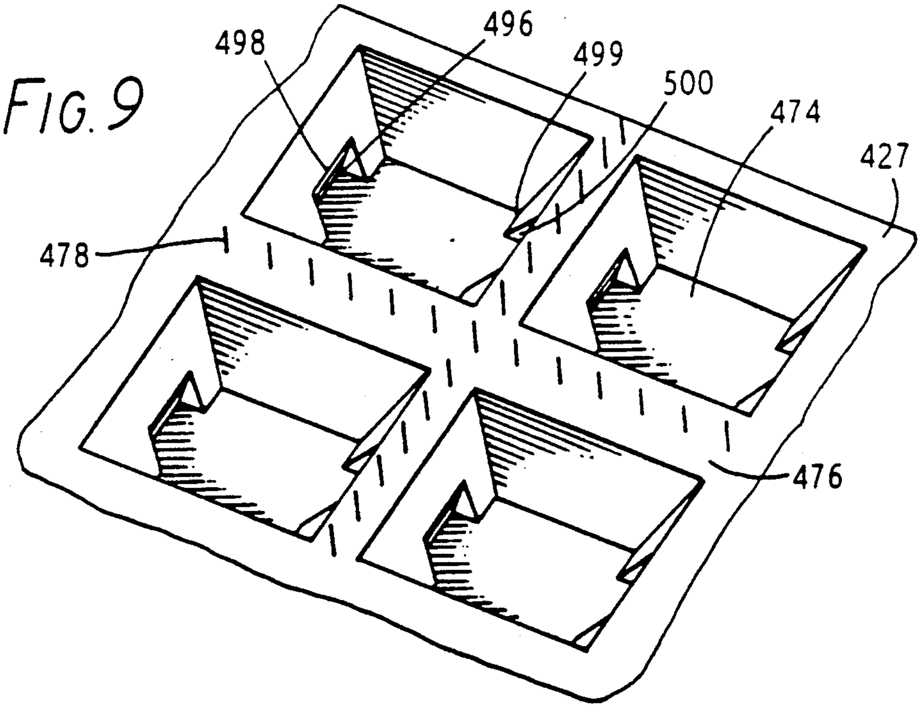
FIG. 9 shows a top perspective view of part of the surface of the second female shaping and perforation roller that mates with the second male shaping and perforation roller for forming an open cell, air permeable laminate that is used in forming lightweight, thin-walled tubes.
Figure 10:
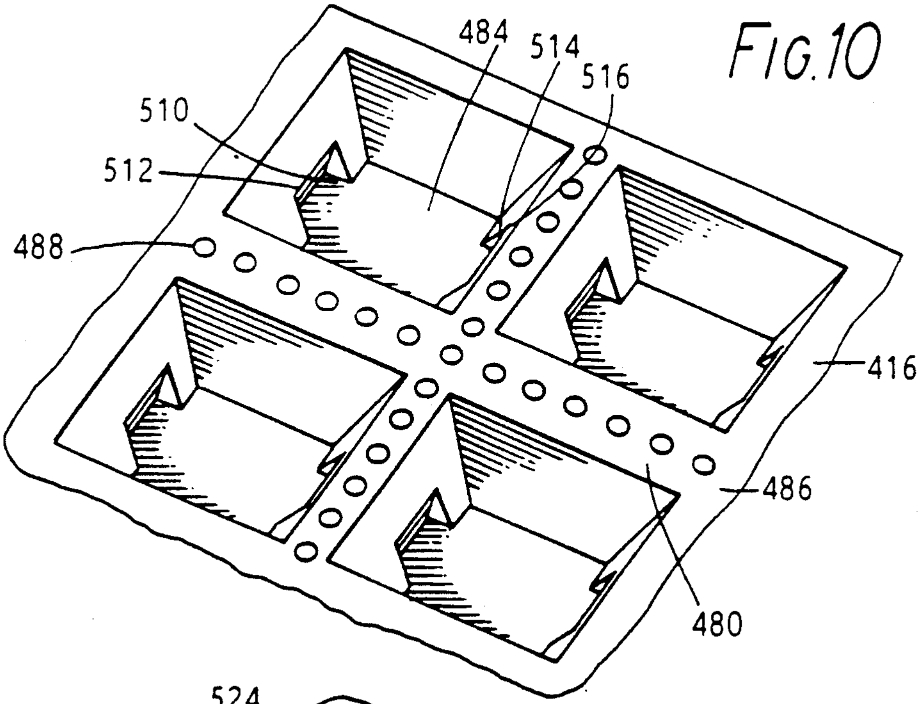
FIG. 10 shows a top perspective view of part of the surface of the first female shaping and perforation roller that mates with the first male shaping and perforation roller for forming an open cell, air permeable laminate that is used in forming lightweight, thin-walled tubes.
Figure 11:
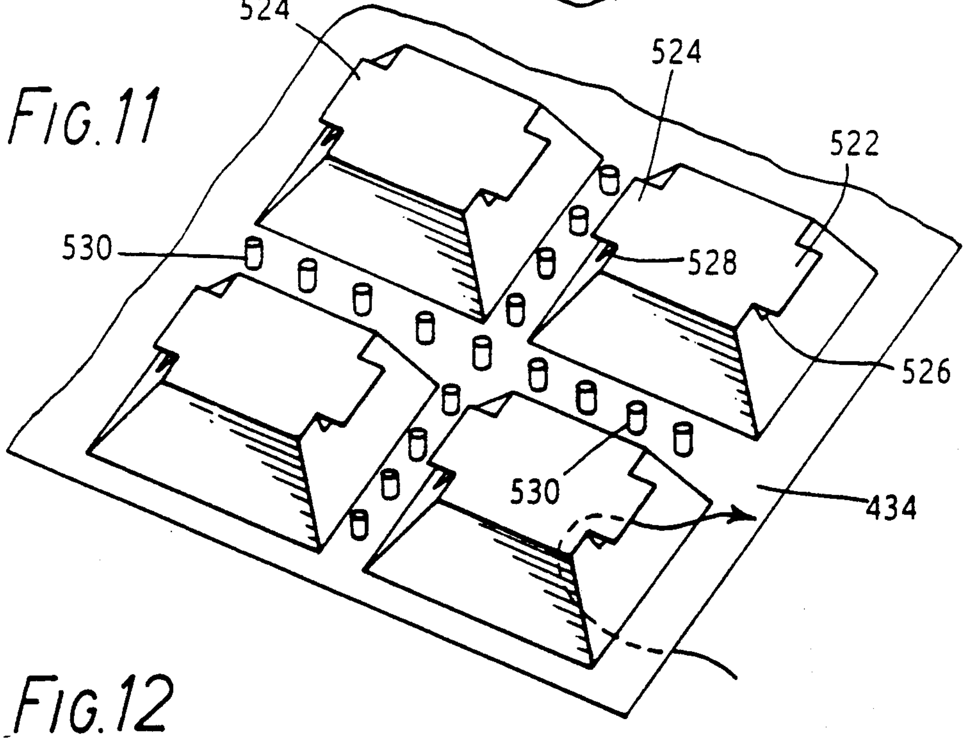
FIG. 11 shows a top perspective view of part of the open cell, air permeable laminate that is used in forming lightweight, thin-walled tubes.
Figure 12:
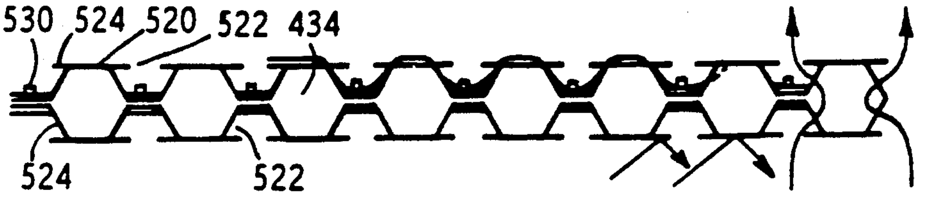
FIG. 12 is a cross-sectional view of the open cell, air permeable laminate that is used in forming lightweight, thin-walled tubes.

FIGS. 6-12 refer to a third embodiment of the front end portion of the apparatus of the present invention. FIG. 6 shows the entire third embodiment of the front end portion of the present invention; FIG. 7 shows the means that shapes and laminates two metal foil strips; FIG. 8 shows part of the surface of the first and second male shaping and perforation rollers used to shape and perforate the metal foil strips; FIG. 9 shows part of the surface of the second female shaping and perforation roller that mates with the second male shaping and perforation roller for shaping and perforating a second metal foil strip, and that mates with the second female shaping and perforation roller for laminating the two metal foil strips together; FIG. 10 shows part of the surface of the first female shaping and perforation roller that mates with the first male shaping and perforation roller for shaping and perforating the first metal foil strip, and that mates with the first female shaping and perforation roller for laminating the two metal foil strips together; FIGS. 11 and 12 show vies of the laminate metal foil strip formed by the third embodiment of the front end portion of the apparatus of the present invention.

Referring to FIG. 6, bobbin support 402 and splicer 410 form the feed for first metal foil strip 406, bobbin support 420 and splicer 428 form the feed for the second metal foil strip, and bobbin support 170 and splicer 178 form the feed for porous paper strip 176. These feed systems operation in the same manner as the feed systems that have been described previously and those descriptions are incorporated here by reference.

Referring to FIG. 7, after metal foil strip 406 leaves splicer 410, it passes over guide roller 412 which aligns metal foil strip 406 for entering the nip of shaping and perforation rollers 414 and 416.

Referring to FIG. 8, male shaping and perforation roller 414 has a pattern of flat-topped pyramids 482 disposed from peripheral surface 480. The top surface of each pyramid has perforating members 481 and 483 extending from two opposing edges. These wedge shaped members extend down respective sides of the pyramids. It is to be understood that the perforating members may extend from one up to all four edges of the top surface of each pyramid and still be within the scope of the present invention.

Referring to FIG. 10, female shaping and perforation roller 416 has a pattern of flat-bottomed pyramids 484 disposed in peripheral surface 486. The flat-bottomed pyramids in female shaping and perforation roller 416 mate with the flat-topped pyramids on the male shaping and perforation roller 414. Each of the flat-bottomed pyramids has wedge-shaped cutouts 510 and 514 in opposing walls of the pyramids. Top edge 512 of cutout 510 and top edge 516 of cutout 514 act as shear points for making rectangular perforations in perforated metal foil strip 418 like those shown at 526 and 528 in FIG. 11. It is to be understood that the cutouts may extend into from one up to all four side walls of each flat-bottomed pyramid and still be within the scope of the present invention.

Again referring to FIG. 7, after metal foil strip 424 leaves splicer 428, it passes over guide roller 426 which aligns metal foil strip 424 for entering the nip of shaping and perforation rollers 430 and 427.

Second male shaping and perforation roller 430 has a pattern of flat-topped pyramids 470 that extend from the peripheral surface 472. Pyramids 470 that extend from male shaping and perforation roller 430 have substantially the same shape as the pyramids 482 that extend from first male shaping and perforation roller 414 except that they are taller.

The top surface of each pyramid 470 has perforating members extending from two opposing edges. These members are wedge-shaped and extend down the respective sides of the pyramids. Like pyramids 482 in roller 414, the perforating members may extend from one up to all four edges of the top surface of each pyramid 470 and still be within the scope of the present invention.

Referring to FIG. 9, second female shaping and perforation roller 427 has a pattern of flat-bottomed pyramids 474 in peripheral surface 476. These flat-bottomed pyramids mate with the flat-topped pyramids of male shaping and perforation roller 430.

Each of the flat-bottomed pyramids has wedge-shaped cutouts 496 and 499 in opposing walls of the pyramids. Top edge 498 of cutout 496 and top edge 500 of cutout 499 act as shear points for making rectangular perforations in perforated metal foil strip 432 like those shown at 526 and 528 in FIG. 11.

Again referring to FIGS. 7 and 9, female shaping and perforation rollers 416 and 427 work cooperatively to laminate perforated metal foil strips 418 and 432. Second female shaping and perforation roller 427 has a pattern of pins 478 extending from its surface. Each pin is normal to the surface. When metal foil strip 424 is perforated at the nip of rollers 427 and 430, the metal foil is disposed over the pins on roller 427. However, during the perforation operation, the pins do not puncture the metal foil strip. Pyramids 470 that extend from the surface of male shaping and perforation roller 430 are taller than pyramids 482 the extend from the surface of roller 414 to commodate metal foil 424 being disposed over pins 478 during the perforation step.

Referring to FIG. 10, first female shaping and perforation roller 416 has a pattern of holes 488 that extend into peripheral surface 486. The holes have the same pattern and, therefore, will mate with pins that extend from the peripheral surface of second female shaping and perforation roller 427. When shaped and perforated metal foil strips 418 and 432 pass through the nip of rollers 416 and 427, pins 478 on roller 427 push a portion of both metal foil strips into corresponding holes 488 in roller 416 which mechanically laminate the two metal foil strips together. Lock structures 530 (FIGS. 7, 11, and 12) are the members formed by the cooperating female shaping and perforation rollers. The metal foil strips are not punctured during the lamination operation.

FIGS. 11 and 12 show views of metal foil laminate 434 that issues from the nip of female shaping and perforation rollers 416 and 427. Each pyramid in metal foil laminate 434 has metal foil extensions 422 and 524, and perforations 526 and 528. These extensions represent the metal foil that was sheared from a pyramid side in forming the perforations. The perforations allow air to flow through metal foil laminate 434.

Metal foil laminate 434 will have the shiny side of at least metal foil strip 406 disposed at the outside surface so that the finished tubes will have a highly reflective surface disposed at the inside diameter. As stated, this is desirable because the tubes formed from the laminate may well be used for making the heat shields for non-combustion smoking articles.

Again referring to FIG. 6, porous paper strip 176 that is supplied to the tube making portion of the apparatus of the present invention is the same as described for the first embodiment of the front end portion shown in FIG. 1. Accordingly, those descriptions are incorporated herein by reference. At the tube forming portion, however, it is laminate 434 that is laminated to porous paper strip rather than the perforated foil formed by the first embodiment of the front end portion of the present invention.

FIG. 13 shows the fourth embodiment of the front end portion of the apparatus of the present invention. In this embodiment, the laminate that is formed by the male and female shaping and perforation rollers differs from that formed by the third embodiment of the front end portion in that the laminate structure formed by the fourth embodiment also includes a porous paper layer. This laminate structure is fed to the tube forming portion and an additional porous paper strip is not laminated to it at the entrance to the tube forming portion.

First metal foil strip 604 is supplied by the feed system that comprises bobbin support 600 with bobbin 602 combining metal foil strip 604 and bobbin spindle 606, and splicer 608. This feed system operations the same as the feed systems that have been described previously and those descriptions are explained here by reference.

After metal foil strip 604 leaves splicer 608, it passes over guide roller 610 which aligns metal foil strip 604 for entering the nip of shaping and perforations rollers 612 and 614. Male shaping and perforation roller 612 has a pattern of flat-topped pyramids like pyramids 482 in FIG. 8. These pyramids are the same as those described for the third embodiment of the front end. Accordingly, those descriptions are applicable here and are incorporated by reference.

Second metal foil strip 624 is supplied by the feed system that comprises bobbin support 620 with bobbin 622 containing metal foil strip 624 and bobbin spindle 626, and splicer 628. This feed system operates the same as the feed systems that have been described previously. Hence, those descriptions are incorporated here by reference.

After metal foil strip 624 leaves splicer 628, it passes over guide rollers 630 and 632 before entering the nip of shaping and perforation rollers 616 and 618. However, in the fourth embodiment of the front end portion, porous paper strip 638 passes through the nip of shaping and perforation rollers 616 and 618.

Porous paper strip 638 is supplied from bobbin support 634 and splicer 642. Bobbin support 634 and splicer 642 form the porous paper strip feed portion. The method by which the two bobbins of porous paper strip material are supplied has been described in other embodiments and those descriptions are incorporated here by reference.

After metal foil strip 638 leaves splicer 642, it passes over a guide roller 632 on top of metal foil strip 624 and both strips enter the nip of shaping and perforation rollers 616 and 618 together. These rollers not only shape and perforate the porous paper and metal foil strips but also laminate the two strips. FIG. 7 shows an enlarged view of a metal foil strip and a porous paper strip being fed together to the nip of a pair of shaping and perforating rollers.

Male shaping and perforation roller 616 and female shaping and perforation roller 618 cause a pattern of pyramids to be formed in porous paper strip 638 and metal foil strip 624 as they pass through the nip. The two strips are laminated after passing through this nip. The strips are laminated together at the perforation points.

After the porous paper/metal foil laminate strip is formed, it is laminated with the shaped and perforated metal foil strip that leaves the nip of shaping and perforation rollers 612 and 614 in the same manner as the two metal foil strips in the third embodiment of the front end portion were laminated. Accordingly, those descriptions are applicable here and incorporated by reference.

Porous paper/metal foil/metal foil laminate strip 644 that issues from the nip of female rollers 614 and 618 has the shiny side of metal foil strip 604 disposed at the outside surface. This will result in the finished tubes having the most reflective surface being disposed at the inside diameter. This is desirable for reflecting heat if the laminate is used for outer sleeves for non-combustion smoking articles.

When laminate strip 644 is formed, the foil strips are offset from the porous paper strip to provide a porous paper "dry line" adjacent one edge. There is also an metal foil/metal foil laminate offset along the other edge. The "dry line" is used for disposition of an adhesive line. This adhesive line is used for the lap seal of tube being formed. In forming the tube, the metal foil/metal foil strip along the one edge will overlap the metal foil/metal foil adjacent "dry line" so that there will be at least one porous paper layer and two metal foil layers at every thickness of the tube.

Upon leaving the nip of female shaping and perforation rollers 614 and 618, porous paper/metal foil/metal foil laminate strip 644 passes over a plurality of rollers 646 enroute suction guide 648. Suction guide 648 measures the porosity of the laminate strip, cleans the laminate strip, and guides the laminate strip for subsequent stations. The porosity measurements are made to ensure that the porosity of the porous paper/metal foil/metal foil laminate is in a predetermined porosity range in CORESTA.

Suction guide 648 is substantially the same as suction guide 138 of the first embodiment. The descriptions of suction guide 138 are equally applicable here and are incorporated reference. The suction air that is applied to the laminate removes metal particles, paper dust, or other particles from laminate 644 that remained with the laminate after the shaping and perforation steps. As stated, the metal particles, paper dust, or other particles may effect the proper formation of the lap seal of the tube being formed.

After leaving the suction guide, laminate 644 passes over rollers 646 and then moves past adhesive applicator 656 which applies an adhesive along the "dry line."

Once the adhesive has been applied, laminate 644 passes pre-heater 658. The pre-heater pre-dries the adhesive applied along the "dry line" before the laminate enters the garniture.

Laminate 644 with the pre-dried adhesive disposed at the "dry line" now passes over roller 646 and enters lubrication station 660. Lubrication station 660 is substantially the same as lubrication station 146 in the first embodiment. The descriptions for lubrication station 138 apply equally here and are incorporated by reference. Accordingly, the wick applies the lubricant to predetermined portions of the shaped and perforated metal foil strip that constitute on side of the porous paper/metal foil/metal foil strip. The lubricant is applied in such a manner that it will not interfere with the lap seal that will be formed in the finished tubes.

Following lubrication, porous paper/metal foil/metal foil strip 644 passes over guide roller 668 and enters the tube forming portion of the apparatus on the present invention.

Even though the suction guide, adhesive applicator(s), and lubrication stations have been described as being part of the four embodiments of the front end portion of the apparatus of the present invention, it is understood and within the scope of the present invention that these devices may be part of tubes forming portion.

FIGS. 14 and 15 show view of the second embodiment of the tube forming portion on the apparatus of the present invention. The second embodiment of the tube forming portion may be used with any of the four embodiments of the front end portion that have been described.

Referring to FIGS. 14 and 15, the tube forming portions is similar to the first embodiment of the tube forming portion that have been described except that heating bar 194 is replaced with pressure belt assembly 704 and mandrel 702 is heated.

The pressure belt assembly is used for pressing against the lap seal to assist in drying the adhesive at the lap seal. It has the added feature of reducing drag on the tube being formed since the belt moves at the same speed as the tube while pressing the lap seal.

Endless garniture belt 198 moves laminate 230, comprised of porous paper strip 176 and lubricated, perforated metal foil strip 134, into and through the garniture. Mandrel 702 which is pivotally mounted at the entrance of garniture extends into the garniture. The degree of movement afforded the mandrel because it is pivotally mounted prevents the incidence of pinch points between the mandrel, and garniture block and side folders.

The mandrel is connected to an electrical energy source for powering the heating elements disposed in it. The heating elements heat the mandrel for drying the adhesive at the lap seal as will be described.

Heated mandrel 702 is elongated and may extend substantially the entire length of the garniture block. Heated mandrel 702, like solid mandrel 191 of the first embodiment shown in FIG. 1, has a first section that has a circular cross-section with a flat top and a second section, which is a remainder, that has a circular cross-section. The descriptions and functions of mandrel 191 as they apply to the two section shape of the mandrel are applicable here and are incorporated by reference.

The first section of heated mandrel 702 that has a flat top extends from the entrance to the garniture into the initial part where garniture is formed by garniture block 190, and side folders 250 and 252 that fully cover the flat top of the mandrel. This configuration of the mandrel and folders helps assure that a strong lap seal is formed.

When the laminate enters garniture, the lubricant on the metal foil minimizes the drag on the laminate as it passes over heated mandrel 702.

As the lap seal is formed between the flat top surface of heated mandrel 702 and side folders 250 and 252, the heat from the mandrel begins the final drying of the lap seal adhesive. The mandrel heats the lap seal for its entire length which includes when the lap seal passes over the second section of the mandrel. Hence, the heated mandrel has a sufficient temperature and length to dry the adhesive a predetermined amount.

Shortly after the cross-sectional shape of heated mandrel 702 becomes fully circular, the lap seal contacts press belt 712 of pressure belt assembly 704. As shown in FIG. 15, press belt 712 is disposed between side folders 250 and 252. However, it is to be understood that at the entrance of the garniture, side folders 250 and 252 are similar to side folders 232 and 234 shown in FIG. 2.

Pressure belt assembly 704 has body 705. Large diameter wheels 706 and 708 are disposed from the front face of this body at opposite ends and a plurality of small diameter wheels 710 are disposed from the front face between the two large diameter wheels. Pressure belt assembly 704 has tensioner 714 which applies a predetermined tension to press belt 712.

In cross-sectional view, the inside surface of press belt 712 is flat and the outside surface is concave. This allows greater contact between each of the wheels and the belt, and the belt and the lap seal of the tube. Each of the wheels, both large and small, have a rectangular, annular groove for receipt of press belt 712. (FIG. 15).

Wheels 706, 708, and 710 of pressure belt assembly 704 are idlers. When garniture belt 198 moves the laminate 230 through the tube forming portion of the apparatus, press belt 712, which is applying downward pressure on the lap seal, moves with the tube. That is, the laminate movement drives the press belt. This reduces the drag on the laminate as it passes through the garniture in forming the tube.

The formed tube exits the garniture after passing the end of pressure belt assembly 704. It then enters cutter section 196 of the apparatus of the present invention shown in FIG. 1. As described previously, the cutter section cuts the tubes to desired length. The cut tubes are sent for example, to a feed hopper of another apparatus that will perform other work on the tubes before they are used in the manufacture of the non-combustion smoking articles.

FIGS. 16 and 17 show views of the third embodiment of the tube forming portion on the apparatus of the present invention. The third embodiment of the tube forming portion, like the second embodiment, may be used with any of the four embodiments of the front end portion of the apparatus of the present invention.

Referring to FIGS. 16 and 17, tube forming differs from that by the first and second embodiments of the tube forming portions in that the side folders rather than a heating bar or press belt are used in forming the lap seal, and full wrap garniture belt is used.

At the entrance to the garniture, heated mandrel 755 is positioned over full wrap, endless garniture belt 752 that has the laminate comprised of porous paper strip 176 and lubricated, perforated metal foil strip 134 disposed on it. Thereafter, the heated mandrel extends the substantially length of the garniture.

The heated mandrel is pivotally mounted in the garniture and connected to an electrical energy source for energizing the heating elements. As stated, pivotally mounting the mandrel affords it movement in the garniture to prevent the incidences of pinch points between the mandrel, and garniture block and side folders.

Heated mandrel 755 is the same as heated mandrel 702 in the second embodiment of the tube forming portion. Thus, the descriptions for heated mandrel 702 are incorporated by reference.

When laminate 230 enters the garniture, the lubricant on the metal foil surface minimizes the drag as the laminate passes over heated mandrel 702. As the tube being formed moves over the heated mandrel, the mandrel temperature is sufficient to dry the adhesive at the lap seal.

As the cross-sectional shape of heated mandrel 755 changes to circular, side folders 754 and 756 continue to enclose the lap seal, as shown in FIG. 17. Side folders 754 and 756 have this shape for the remaining length of the garniture.

Full wrap garniture belt 752 extends around the bore formed by garniture block 190, and side folders 754 and 756. This puts pressure on the lap seal of lamination 230 for proper tube formation.

The formed tube exits the garniture and enters cutter section 196 of the apparatus of the present invention shown in FIG. 1. As described previously, the cutter section cuts the tube to desired lengths and sends the cut tube, for example, to a feed hopper for another apparatus that will perform other work on the tubes before they are used in the manufacture of the non-combustion smoking articles.

The first, second, and third embodiments of the tube forming portion of the present invention may also have a suction device disposed immediately before the entrance to the folders for removing any dust, paper particles, or metal particles that remain with the laminate. This helps insure that a strong lap seal is formed.

The terms and expressions which are used here are used as terms of description and not of limitation. There is not intent, in the use of such terms and expressions, of excluding the equivalents of the features shown and described, or portions thereof, it being recognized that various modifications are possible within the scope of the present invention.

We claim:

1. An apparatus for forming tubular members from laminate strip material, comprising:

(a) means for perforating a metal foil means, further comprising,
   (1) means for supplying a metal foil means,
   (2) means for perforating the metal foil means with a predetermined pattern,
   (3) means for removing from the metal foil means at the perforation sites portions of the metal foil means that are formed and extend from a surface of the metal foil means as the metal means is perforated by the perforation means, and
   (4) means for calendering the perforated metal foil means that has had the portions of the metal foil means that extended from the surface of the metal foil means at the perforation sites removed;
(b) means for measuring the porosity and cleaning the perforated and calendered metal foil means;
(c) means for lubricating a surface of the perforated and calendered metal foil means that has the porosity measured and has been cleaned;
(d) means for supplying a substrate;
(e) means for applying a sealing material to the substrate; and
(f) means for forming tubular members from the laminate strip material comprising the metal foil means of (c) and the substrate of (e) that are secured with a portion of the sealing material applied to the substrate.

2. The apparatus as recited in claim 1, wherein the perforating means comprises male perforation means and mating female perforation means.

3. The apparatus as recited in claim 2, wherein the male perforation means includes a male perforation roller with a surface used in perforating the metal foil means having a plurality of pins disposed therefrom.

4. The apparatus as recited in claim 3, wherein the female perforation means includes a female perforation roller with a surface used in perforating the metal foil means having a plurality of relief areas disposed therein that are aligned to mate with the plurality of pins of the male perforation roller.

5. The apparatus as recited in claim 2, wherein the female perforation means includes a belt.

6. The apparatus as recited in claim 5, wherein the belt includes a continuous belt.

7. The apparatus as recited in claim 6, wherein the continuous belt includes a belt with a smooth surface.

8. The apparatus as recited in claim 1, wherein the calendering means comprises a pair of calender rollers.

9. The apparatus as recited in claim 8, wherein the surfaces of the calender rollers are smooth.

10. The apparatus as recited in claim 1, wherein the means for applying a sealing material includes an adhesive applying means.

11. The apparatus as recited in claim 10, wherein the adhesive applying means includes an adhesive gun that applies a hot melt adhesive.

12. The apparatus as recited in claim 10, wherein the adhesive applying means includes at least two adhesive guns for applying adhesive adjacent first and second edges of the substrate.

13. The apparatus as recited in claim 10, wherein the apparatus further includes a means to pre-dry the sealing material after it is applied.

14. The apparatus as recite in claim 13, wherein the pre-drying means includes a pre-heater.

15. The apparatus as recited in claim 1 wherein the means for forming tubular members from the laminate strip material of (f), further comprises, (1) transport means for moving the laminate strip material through the tubular member forming means, (2) folding means for at least positioning a first and a second edge of the laminate strip material in a predetermined relationship for sealing the tubular members being formed, (3) a mandrel that is disposed in the forming means and around which the laminate strip material is disposed in forming the tubular members, and (4) means for setting the sealing material that is used for sealing the tubular members being formed.

16. The apparatus as recited in claim 15, wherein the apparatus further includes means for measuring the porosity and cleaning at least one of the strips of strip material that comprise part of the laminate strip material.

17. The apparatus as recited in claim 15, wherein means for setting the sealing material includes a heater bar for promoting rapid drying of the sealing material when the first and second edges are disposed in the predetermined relationship.

18. The apparatus as recited in claim 15, wherein the apparatus further includes a cutter means to cut a continuous tubular member into separate tubular members of predetermined lengths.

19. The apparatus as recited in claim 15, wherein the apparatus further includes means for lubricating a portion of the laminate strip material that is disposed adjacent the mandrel.

20. The apparatus as recited in claim 15, wherein the folding means includes a garniture block with folders.

21. The apparatus as recited in claim 20, wherein the garniture block with folders is elongated.

22. The apparatus as recited in claim 21, wherein, the garniture block with folders overlaps the first and second edges of the laminate strip material in a predetermined manner.

23. The apparatus as recited in claim 15, wherein the mandrel is pivotally mounted in the forming means.

24. The apparatus as recited in claim 23, wherein the mandrel is heated.

25. The apparatus as recited in claim 23, wherein the mandrel is elongated.

26. The apparatus as recited in claim 25, wherein the mandrel includes a mandrel with first and second sections.

27. The apparatus as recited in claim 26, wherein the first section of the mandrel has a cross-section that is substantially circular with a flat top.

28. The apparatus as recited in claim 26, wherein the second section of the mandrel has a cross-section that is substantially circular.

29. The apparatus as recited in claim 15, wherein the transport means is an endless belt.

30. The apparatus as recited in claim 29, wherein means for setting the sealing material includes a heated mandrel for promoting rapid drying of the sealing material when the first and second edges are disposed in the predetermined relationship.

31. The apparatus as recited in claim 30, wherein the means for setting the sealing material further includes pressure belt means that cooperates with the heated mandrel for promoting rapid drying of the sealing material when the first and second edges are disposed in the predetermined relationship.

32. The apparatus as recited in claim 30, wherein the means for setting the sealing material further includes full enclosure side folders that cooperate with the heated mandrel for promoting rapid drying of the sealing material when the first and second edges are disposed in the predetermined relationship, and with the endless belt being a full wrap belt.

33. An apparatus for forming tubular members from laminate strip material, comprising:

(a) means for forming the laminate strip material from a perforated metal foil means and a substrate, further comprising, (1) means for supplying the metal foil means, (2) means for supplying the substrate;

(3) means for perforating the metal foil means with a predetermined pattern and minimizing a separation of the material from the metal foil means at each perforation site in making the perforations, and (4) means for calendering the perforated metal foil means and the substrate to form the laminate strip material;

(b) means for measuring the porosity and cleaning the laminate strip material;

(c) means for lubricating a portion of the laminate strip material;

(d) means for applying a sealing material to the laminate strip material; and (e) means for forming tubular members from the laminate strip material.

34. The apparatus as recited in claim 33, wherein the apparatus further includes guide means for aligning the metal foil means for passing through the perforating means and the calendering means.

35. The apparatus as recited in claim 33, wherein the apparatus further includes guide means for aligning the substrate for passing through the calendering means.

36. The apparatus as recited in claim 33, wherein the calendering means comprises a pair of calendar rollers.

37. The apparatus as recited in claim 36, wherein the surfaces of the calendar rollers are smooth.

38. The apparatus as recited in claim 33, wherein the perforating means comprises male perforation means and female perforation means.

39. The apparatus as recited in claim 38, wherein the male perforation means includes a male perforation roller with a surface used in perforating the metal foil means having a plurality of pins disposed therefrom.

40. The apparatus as recited in claim 39, wherein the female perforation means includes a female perforation roller with a surface used in perforating the metal foil means having a plurality of relief areas disposed therein that are aligned to mate with the plurality of pins of the male perforation roller.

41. The apparatus as recited in claim 38, wherein the female perforation means includes a belt.

42. The apparatus as recited in claim 41, wherein the belt includes a continuous belt.

43. The apparatus as recited in claim 42, wherein the continuous belt includes a belt with a smooth surface.

44. The apparatus as recited in claim 33, wherein the means for applying a sealing material includes an adhesive applying means.

45. The apparatus as recited in claim 44, wherein the adhesive applying means includes an adhesive gun that applies a hot melt adhesive.

46. The apparatus as recited in claim 44, wherein the adhesive applying means includes at least one adhesive gun for applying adhesive adjacent an edge of laminate strip material.

47. The apparatus as recited in claim 44, wherein the apparatus further includes a means to pre-dry the sealing material after it is applied.

48. The apparatus as recite in claim 47, wherein the pre-drying means includes a pre-heater.

49. The apparatus as recited in claim 33, wherein the means for forming tubular members from the laminate strip material, further comprises, (1) transport means for moving the laminate strip material through the tubular member forming means, (2) folding means for at least positioning a first and a second edge of the laminate strip material in a predetermined relationship for sealing the tubular members being formed, (3) a mandrel that is disposed in the folding means and around which the laminate strip material is disposed in forming the tubular members, and (4) means for setting the sealing material that is used for sealing the tubular members being formed.

50. The apparatus as recited in claim 49, wherein means for setting the sealing material includes a heater bar for promoting rapid drying of the sealing material when the first and second edges are disposed in the predetermined relationship.

51. The apparatus as recited in claim 49, wherein the apparatus further includes a cutter means to cut a continuous tubular member into separate tubular members of predetermined lengths.

52. The apparatus as recited in claim 49, wherein the lubrication means lubricates the exposed surface of the metal foil means that part of the laminate strip material.

53. The apparatus as recited in claim 49, wherein the mandrel is pivotally mounted in the forming means.

54. The apparatus as recited in claim 53, wherein the mandrel is heated.

55. The apparatus as recited in claim 53, wherein the mandrel is elongated.

56. The apparatus as recited in claim 55, wherein the mandrel includes a mandrel with first and second sections.

57. The apparatus as recited in claim 56, wherein the first section of the mandrel has a cross-section that is substantially circular with a flat top.

58. The apparatus as recited in claim 56, wherein the second section of the mandrel has a cross-section that is substantially circular.

59. The apparatus as recited in claim 49, wherein the transport means is an endless belt.

60. The apparatus as recited in claim 59, wherein the folding means includes a garniture block with folders.

61. The apparatus as recited in claim 60, wherein the garniture block with folders is elongated.

62. The apparatus as recited in claim 61, wherein, the garniture block with folders overlaps the first and second edges of the laminate strip material in a predetermined manner.

63. The apparatus as recited in claim 59, wherein means for setting the sealing material includes a heated mandrel for promoting rapid drying of the sealing material when the first and second edges are disposed in the predetermined relationship.

64. The apparatus as recited in claim 63, wherein the means for setting the sealing material further includes pressure belt means that cooperates with the heated mandrel for promoting rapid drying of the sealing material when the first and second edges are disposed in the predetermined relationship.

65. The apparatus as recited in claim 63, wherein the means for setting the sealing material further includes full enclosure side folders that cooperate with the heated mandrel for promoting rapid drying of the sealing material when the first and second edges are disposed in the predetermined relationship, and with the endless belt being a full wrap belt.

66. An apparatus for forming tubular members from laminate strip material, comprising:

(a) means for shaping and perforating a metal foil means, further comprising, (1) means for shaping and perforating at least two strips of metal foil means with a predetermined pattern, and (2) means for laminating at least the two shaped and perforated strips of metal foil means;

(b) means for measuring the porosity and cleaning the laminated strip of shaped and perforated metal foil means;

(c) means for lubricating a surface of the laminated strip of shaped and perforated metal foil means;

(d) means for supplying a substrate;

(e) means for applying a sealing material to the substrate; and (f) means for forming tubular members from laminate strip material comprising the laminate metal foil means of (c) and the substrate of (e) that are laminated to form the laminate strip material with a portion of the sealing material applied to the substrate.

67. The apparatus as recited in claim 66, wherein the apparatus further includes guide means for aligning the strips of metal foil means for passing through the shaping and perforating means and the laminating means.

68. The apparatus as recited in claim 66, wherein the means for applying a sealing material includes an adhesive applying means.

69. The apparatus as recited in claim 68, wherein the adhesive applying means includes an adhesive gun that applies a hot melt adhesive.

70. The apparatus as recited in claim 68, wherein the adhesive applying means includes at least two adhesive guns for applying adhesive adjacent first and second edges of the substrate.

71. The apparatus as recited in claim 68, wherein the apparatus further includes a means to pre-dry the sealing material after it is applied.

72. The apparatus as recited in claim 71, wherein the pre-drying means includes a pre-heater.

73. The apparatus as recited in claim 66, wherein the shaping and perforating means includes first and second female rollers, and first and second male rollers.

74. The apparatus as recited in claim 73, wherein the first and second male rollers have a plurality of shaped members disposed from the outside surface.

75. The apparatus as recited in claim 74, wherein the shaped members are pyramid shaped.

76. The apparatus as recited in claim 75, wherein the pyramid shaped members have at least one extension for perforating the metal foil means disposed from a top surface in a plane of the top surface.

77. The apparatus as recited in claim 74, wherein the shaped members on the first male roller have a different height than the shaped members on the second male roller.

78. The apparatus as recited in claim 74, wherein the first and second female rollers have shaped relief areas disposed in the outside surface that mate, respectively, with the shaped members at the outside surface of the first and second male rollers.

79. The apparatus as recited in claim 78, wherein the shaped relief ares are pyramid shaped.

80. The apparatus as recited in claim 79, wherein the pyramid shaped relief areas have at least one extension for perforating the metal foil means disposed from a bottom surface in a plane of the bottom surface.

81. The apparatus as recited in claim 78, wherein the second female roller has a plurality of lock-forming means extending from the outside surface.

82. The apparatus as recited in claim 81, wherein the lock-forming means includes pins disposed from the outside surface of the second female roller.

83. The apparatus as recited in claim 81, wherein the first female roller has a plurality of lock receptacle means disposed in the outside surface that mate with the lock-forming means of the second female roller.

84. The apparatus as recited in claim 83 wherein the lock receptacle means includes orifices disposed in the outside surface of the first female roller.

85. The apparatus as recited in claim 66, wherein the means for forming tubular members from the laminate strip material of (f), further comprises, (1) transport means for moving the laminate strip material through the tubular member forming means, (2) folding means for at least positioning a first and a second edge of the laminate strip material in a predetermined relationship for sealing the tubular members being formed, (3) a mandrel that is disposed in the folding means and around which the laminate strip material is disposed in forming the tubular members, and (4) means for setting the sealing material that is used for sealing at a lap seal the tubular members being formed.

86. The apparatus as recited in claim 85, wherein the apparatus further includes means for measuring the porosity and cleaning at least one of the strips of strip material that comprise part the laminate strip material.

87. The apparatus as recited in claim 85, wherein the apparatus further includes a cutter means to cut a continuous tubular member into separate tubular members of predetermined lengths.

88. The apparatus as recited in claim 85, wherein the apparatus further includes means for lubricating a portion of the laminate strip material that is disposed adjacent the mandrel.

89. The apparatus as recited in claim 85, wherein means for setting the sealing material includes a heater bar for promoting rapid drying of the sealing material when the first and second edges are disposed in the predetermined relationship.

90. The apparatus as recited in claim 85, wherein the transport means is an endless belt.

91. The apparatus as recited in claim 90, wherein means for setting the sealing material includes a heated mandrel for promoting rapid drying of the sealing material when the first and second edges are disposed in the predetermined relationship.

92. The apparatus as recited in claim 91, wherein the means for setting the sealing material further includes pressure belt means that cooperates with the heated mandrel for promoting rapid drying of the sealing material when the first and second edges are disposed in the predetermined relationship.

93. The apparatus as recited in claim 91, wherein the means for setting the sealing material further includes full enclosure side folders that cooperate with the heated mandrel for promoting rapid drying of the sealing material when the first and second edges are disposed in the predetermined relationship, and with the endless belt being a full wrap belt.

94. The apparatus as recited in claim 85, wherein the folding means includes a garniture block with folders.

95. The apparatus as recited in claim 94, wherein the garniture block with folders is elongated.

96. The apparatus as recited in claim 95, wherein, the garniture block with folders overlaps the first and second edges of the laminate strip material in a predetermined manner.

97. The apparatus as recited in claim 85, wherein the mandrel is pivotally mounted in the folding means.

98. The apparatus as recited in claim 97, wherein the mandrel is heated.

99. The apparatus as recited in claim 97, wherein the mandrel is elongated.

100. The apparatus as recited in claim 99, wherein the mandrel includes a mandrel with first and second sections.

101. The apparatus as recited in claim 100, wherein the first section of the mandrel has a cross-section that is substantially circular with a flat top.

102. The apparatus as recited in claim 100, wherein the second section of the mandrel has a cross-section that is substantially circular.

103. An apparatus for forming tubular members from laminate strip material, comprising:

(a) means for shaping and perforating, and laminating at least two strips of metal foil means and a substrate, further comprising, (1) means for shaping and perforating both the at least two strips of metal foil means and the substrate with a predetermined pattern, and (2) means for laminating the shaped and perforated strips of metal foil means and substrate;

(b) means for measuring the porosity and cleaning the laminate strip material;

(c) means for lubricating a portion of the laminate strip material;

(d) means for applying a sealing material to the laminate strip material; and (e) means for forming tubular members form the laminate strip material.

104. The apparatus as recited in claim 103, wherein the apparatus further includes guide means for aligning the strips of metal foil means and the substrate for passing through the shaping and perforating means, and laminating means.

105. The apparatus as recited in claim 103, wherein the shaping and perforating means includes first and second female rollers, and first and second male rollers.

106. The apparatus as recited in claim 105, wherein the first and the second male rollers have a plurality of shaped members disposed from the outside surface.

107. The apparatus as recited in claim 106, wherein the shaped members on the first male roller have a different height than the shaped members on the second male roller.

108. The apparatus as recited in claim 106, wherein the shaped members are pyramid shaped.

109. The apparatus as recited in claim 108, wherein the pyramid shaped members have at least one extension for perforating the strip metal foil means or substrate disposed from a top surface in the plane of the top surface.

110. The apparatus as recited in claim 106, wherein the first and second female rollers have shaped relief areas disposed in the outside surface that mate, respectively, the shaped members at the outside surface of the first and second male rollers.

111. The apparatus as recited in claim 110, wherein the relief areas are pyramid shaped.

112. The apparatus as recited in claim 111, wherein the pyramid shaped relief areas have at least one extension for perforating the strip of metal foil means or substrate disposed from a bottom surface in the plane of the bottom surface.

113. The apparatus as recited in claim 110, wherein the second female roller has a plurality of lock-forming means extending from the outside surface.

114. The apparatus as recited in claim 113, wherein the lock-forming means includes pins disposed from the outside surface of the second female roller.

115. The apparatus as recited in claim 113, wherein the first female roller has a plurality of lock receptacle means disposed in the outside surface that mate with the lock-forming means of the second female roller.

116. The apparatus as recited in claim 115, wherein the lock receptacle means includes orifices disposed in the outside surface of the first female roller.

117. The apparatus as recited in claim 103, wherein the means for applying a sealing material includes an adhesive applying means.

118. The apparatus as recited in claim 117, wherein the adhesive applying means includes an adhesive gun that applies a hot melt adhesive.

119. The apparatus as recited in claim 117, wherein the adhesive applying means includes at least one adhesive gun for applying adhesive adjacent an edge of the laminate strip material.

120. The apparatus as recited in claim 117, wherein the apparatus further includes a means to pre-dry the sealing material after it is applied.

121. The apparatus as recite in claim 120, wherein the pre-drying means includes a pre-heater.

122. The apparatus as recited in claim 103, wherein the means for forming tubular members from the laminate strip material, further comprises, (1) transport means for moving the laminate strip material through the tubular member forming means, (2) folding means for at least positioning a first and a second edge of the laminate strip material in a predetermined relationship for sealing the tubular members being formed, (3) a mandrel that is disposed in the folding means and around which the laminate strip material is disposed in forming the tubular members, and (4) means for setting the sealing material that is used for sealing at a lap seal the tubular members being formed.

123. The apparatus as recited in claim 122, wherein means for setting the sealing material includes a heater bar for promoting rapid drying of the sealing material when the first and second edges are disposed in the predetermined relationship.

124. The apparatus as recited in claim 122, wherein the apparatus further includes a cutter means to cut a continuous tubular member into separate tubular members of predetermined lengths.

125. The apparatus as recited in claim 122, wherein the lubricating means lubricates the exposed surface of the metal foil means that part of the laminate strip material.

126. The apparatus as recited in claim 122, wherein the transport means is an endless belt.

127. The apparatus as recited in claim 126, wherein means for setting the sealing material includes a heated mandrel for promoting rapid drying of the sealing material when the first and second edges are disposed in the predetermined relationship.

128. The apparatus as recited in claim 127, wherein the means for setting the sealing material further includes pressure belt means that cooperates with the heated mandrel for promoting rapid drying of the sealing material when the first and second edges are disposed in the predetermined relationship.

129. The apparatus as recited in claim 127, wherein the means for setting the sealing material further includes full enclosure side folders that cooperate with the heated mandrel for promoting rapid drying of the sealing material when the first and second edges are disposed in the predetermined relationship, and with the endless belt being a full wrap belt.

130. The apparatus as recited in claim 122, wherein the folding means includes a garniture block with folders.

131. The apparatus as recited in claim 130, wherein the garniture block with folders is elongated.

132. The apparatus as recited in claim 131, wherein, the garniture block with folders overlaps the first and second edges of the laminate strip material in a predetermined manner.

133. The apparatus as recited in claim 122, wherein the mandrel is pivotally mounted in the folding means.

134. The apparatus as recited in claim 133, wherein the mandrel is heated.

135. The apparatus as recited in claim 133, wherein the mandrel is elongated.

136. The apparatus as recited in claim 135, wherein the mandrel includes a mandrel with first and second sections.

137. The apparatus as recited in claim 136, wherein the first section of the mandrel has a cross-section that is substantially circular with a flat top.

138. The apparatus as recited in claim 136, wherein the second section of the mandrel has a cross-section that is substantially circular.

* * * * *